Feb. 10, 1925.　　　　　　　　　　　　　　　　1,525,632
E. E. WILLIAMS
HARVESTER AND BINDER
Filed Dec. 16, 1921　　　11 Sheets-Sheet 1
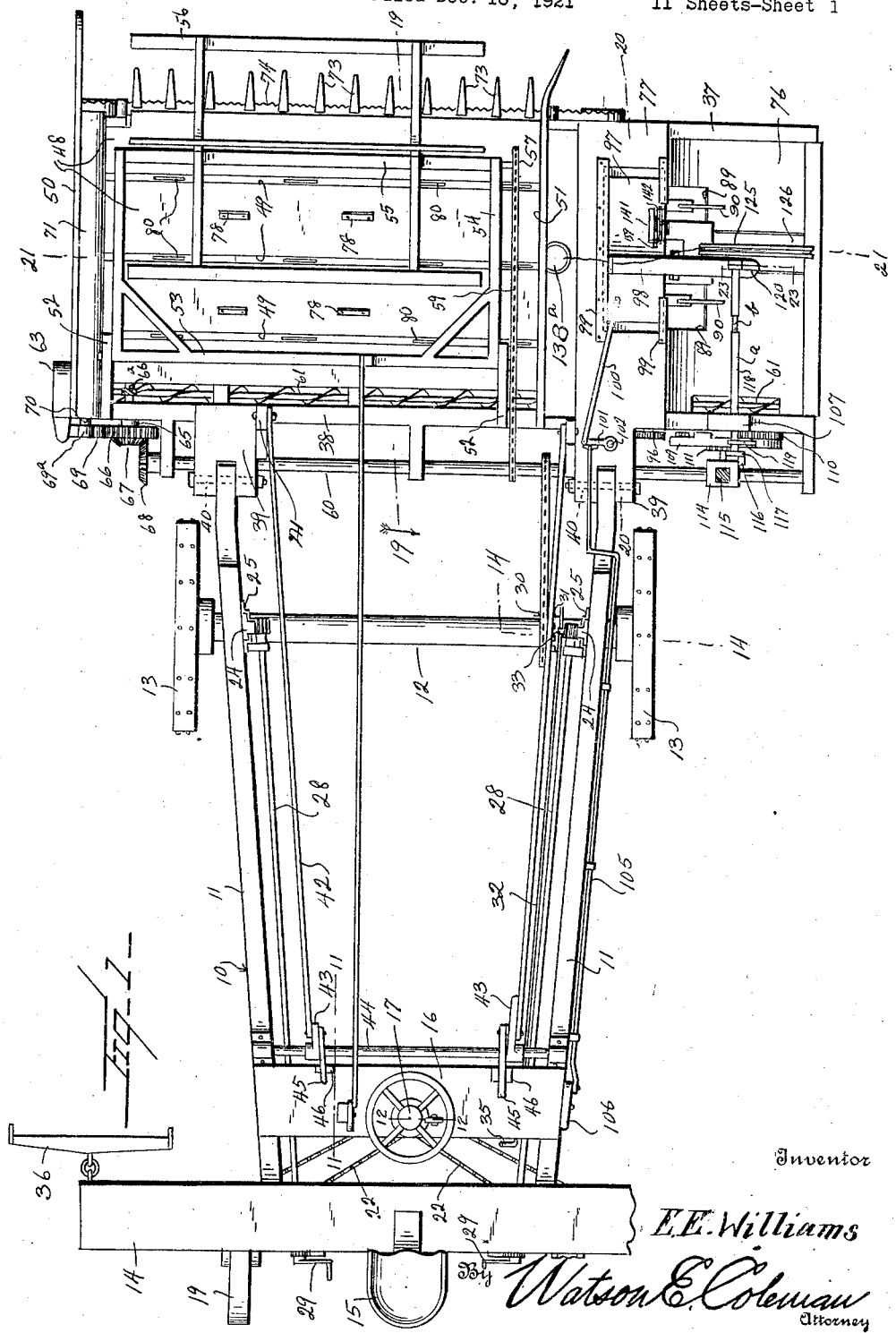
Inventor
E.E. Williams
By Watson E. Coleman
Attorney

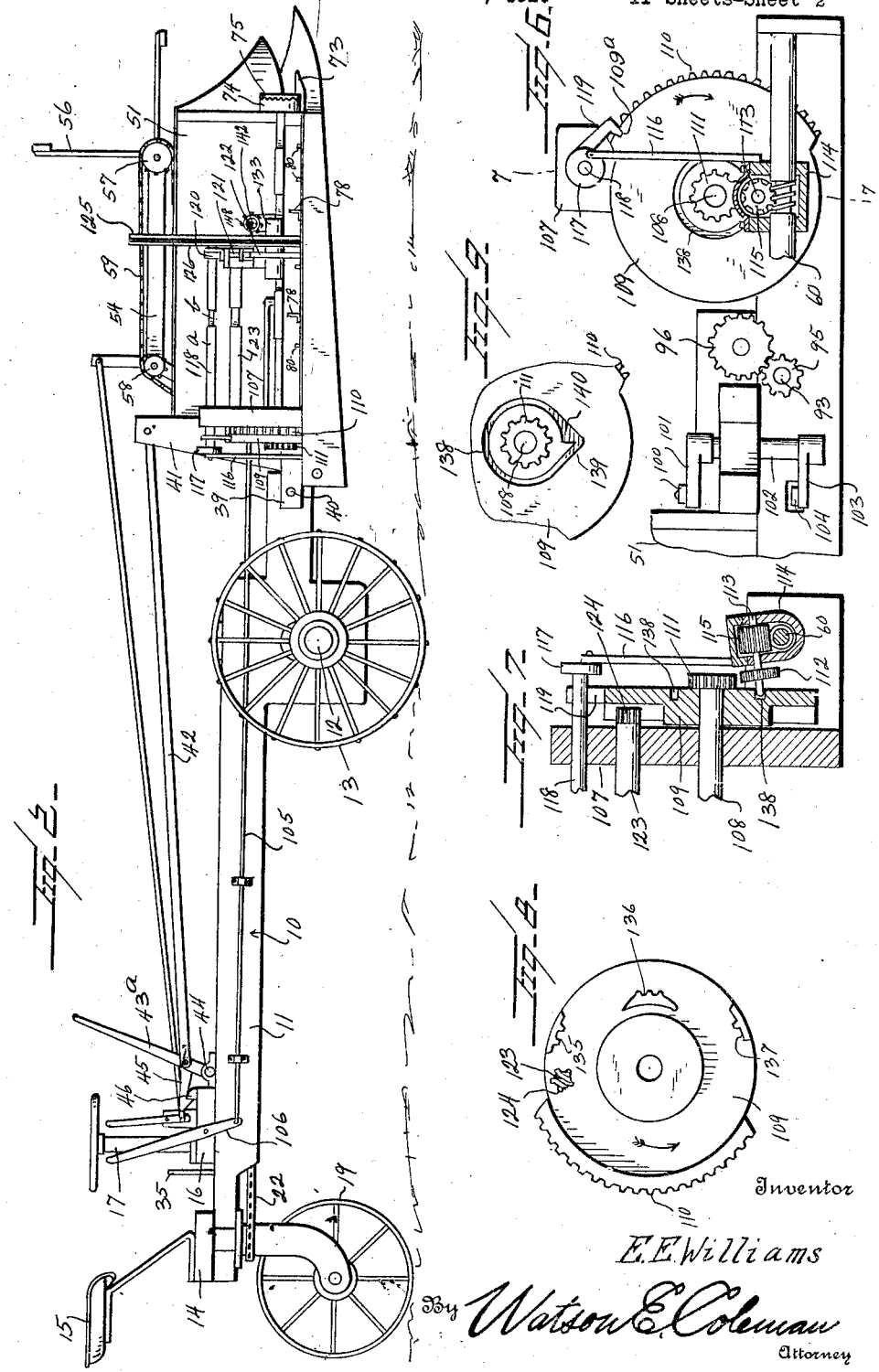

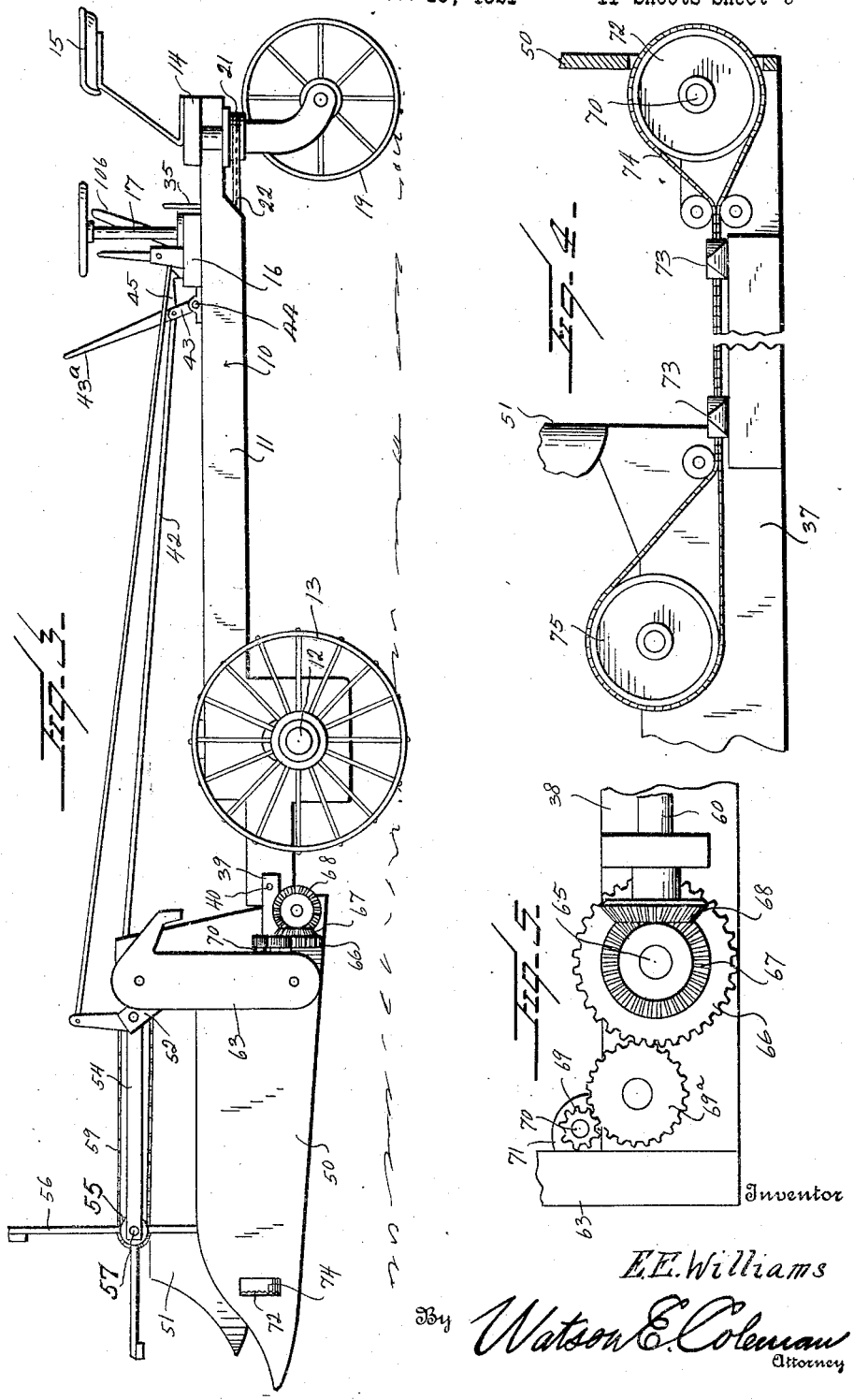

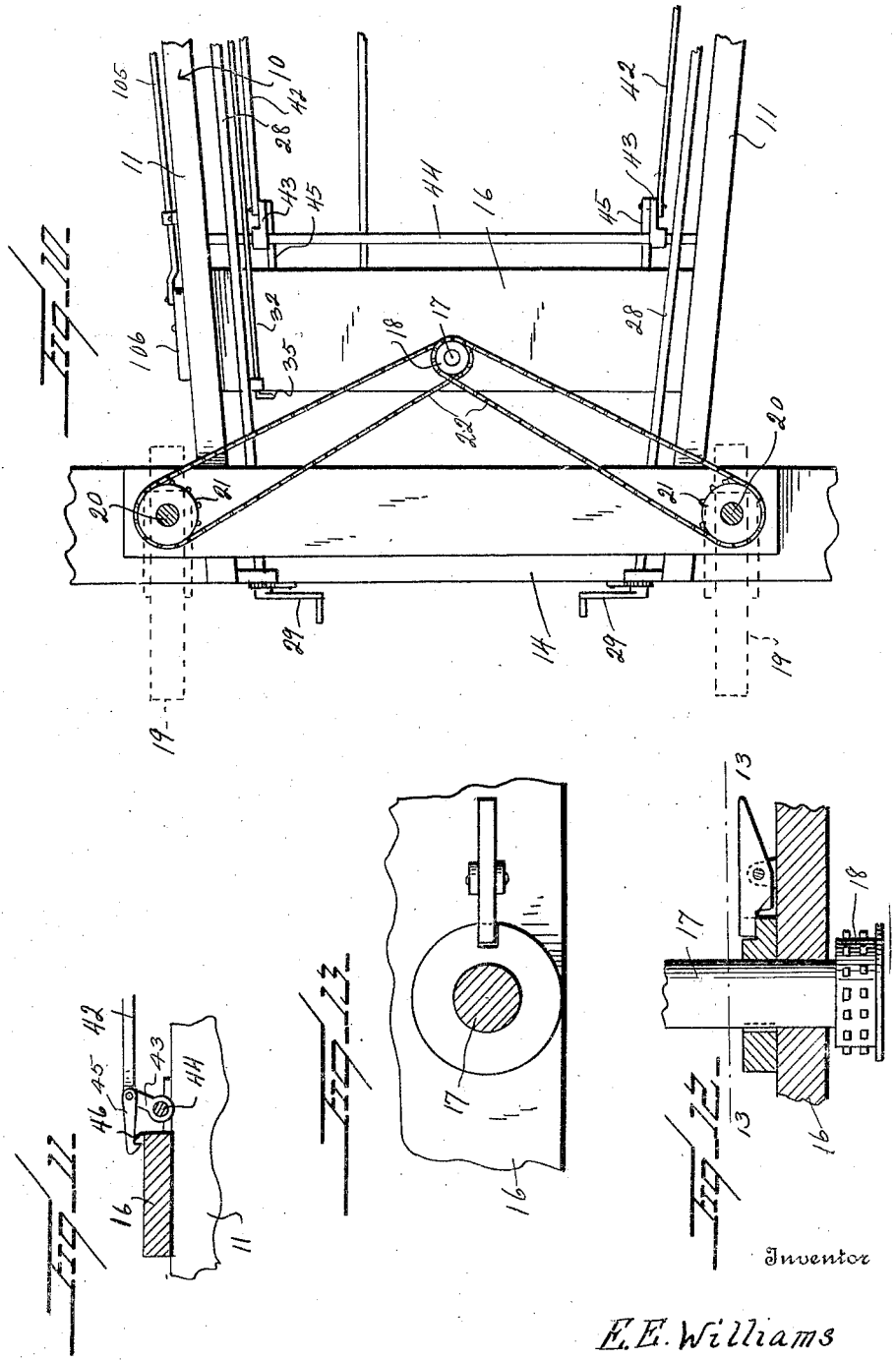

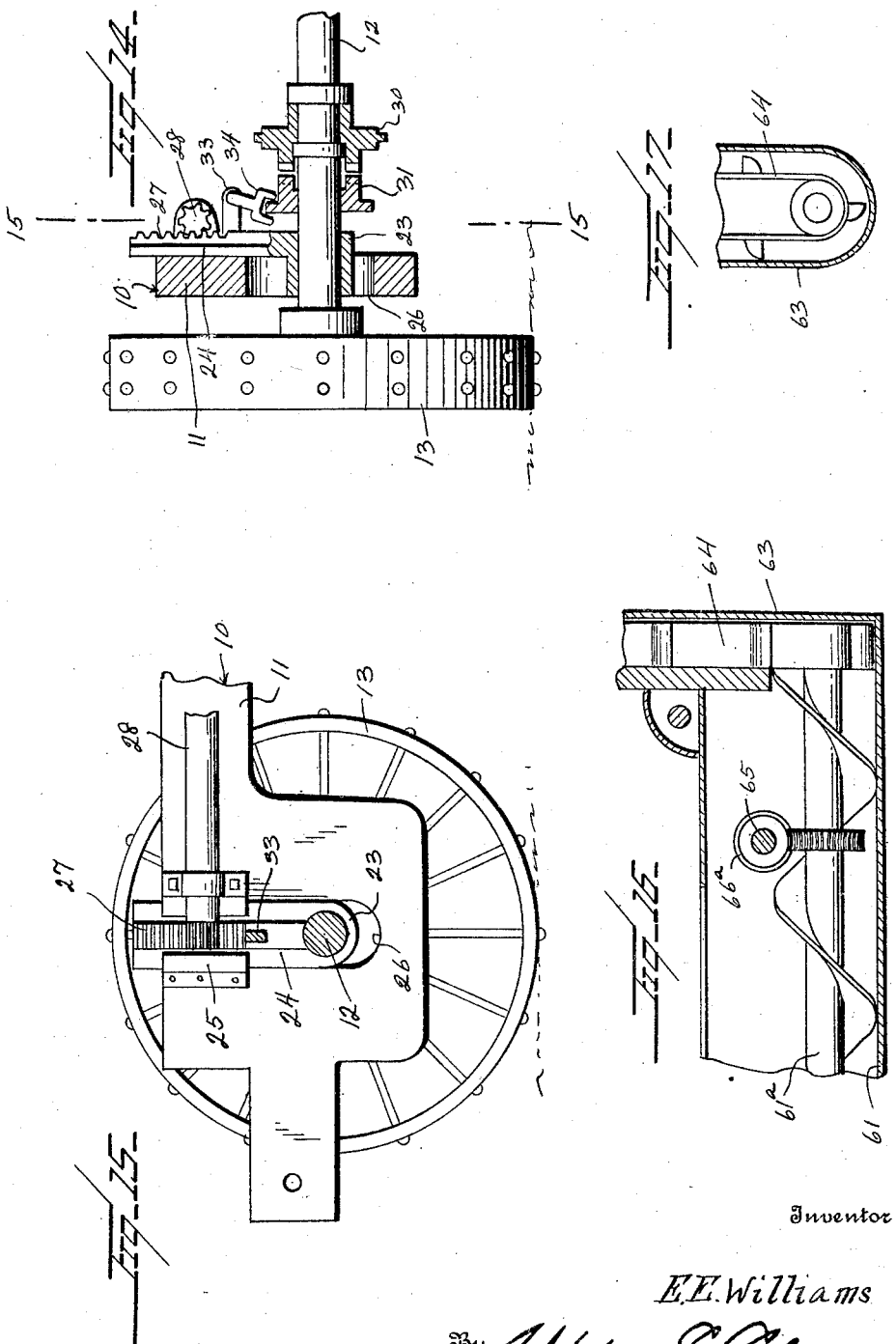

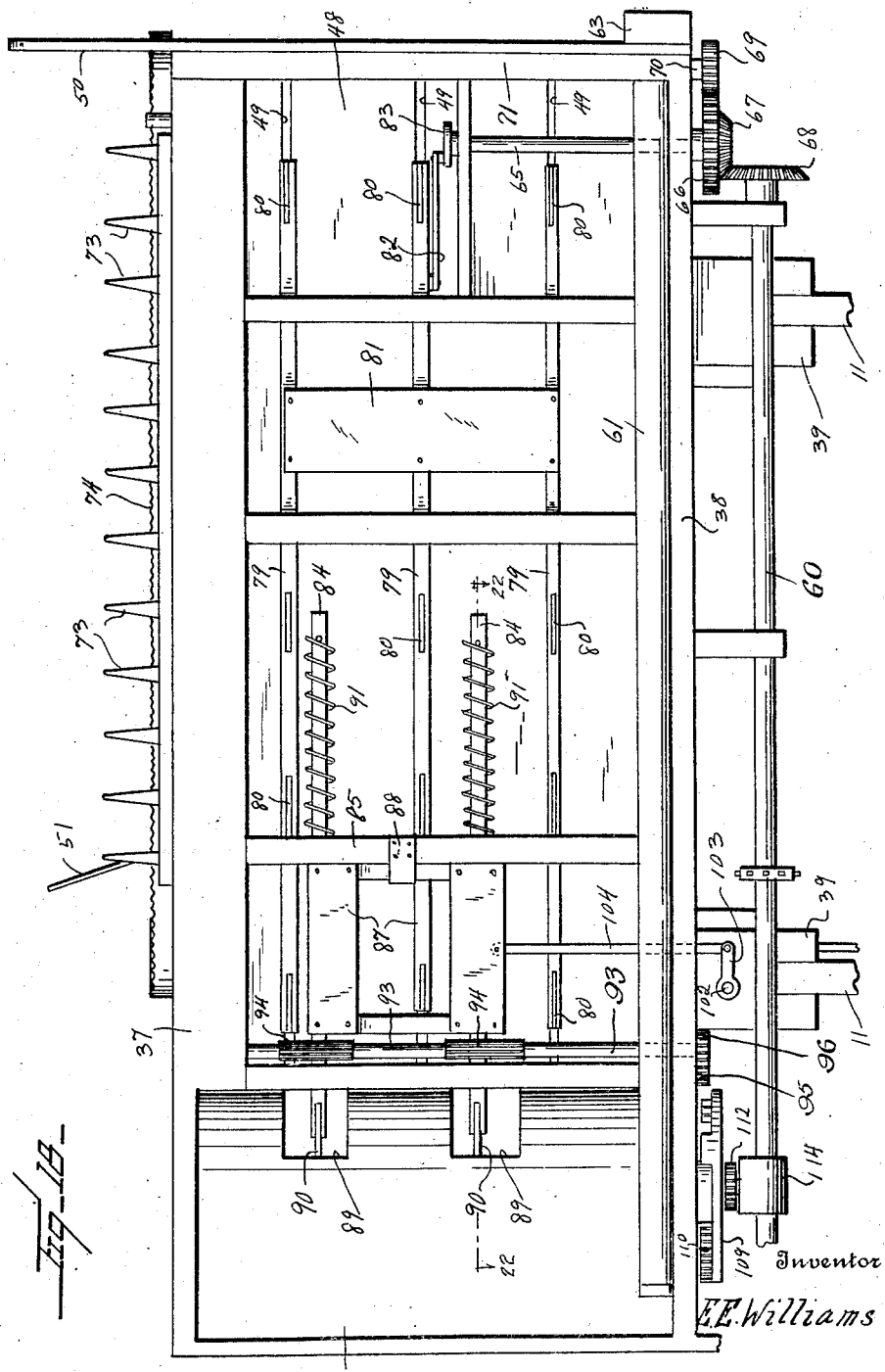

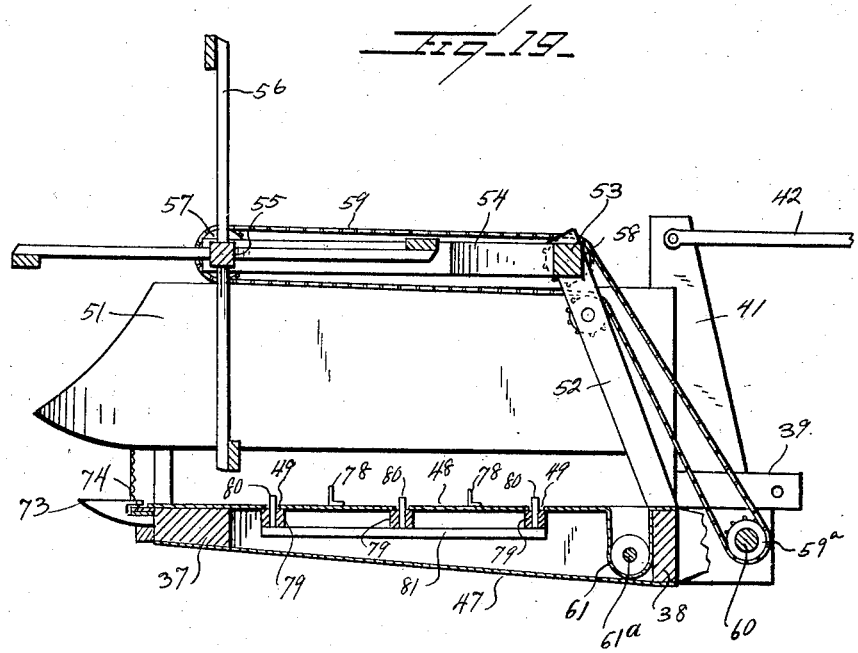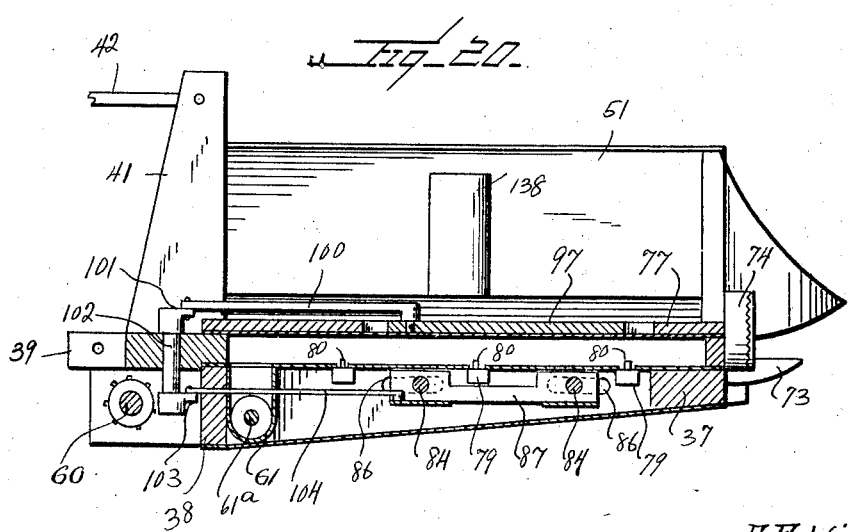

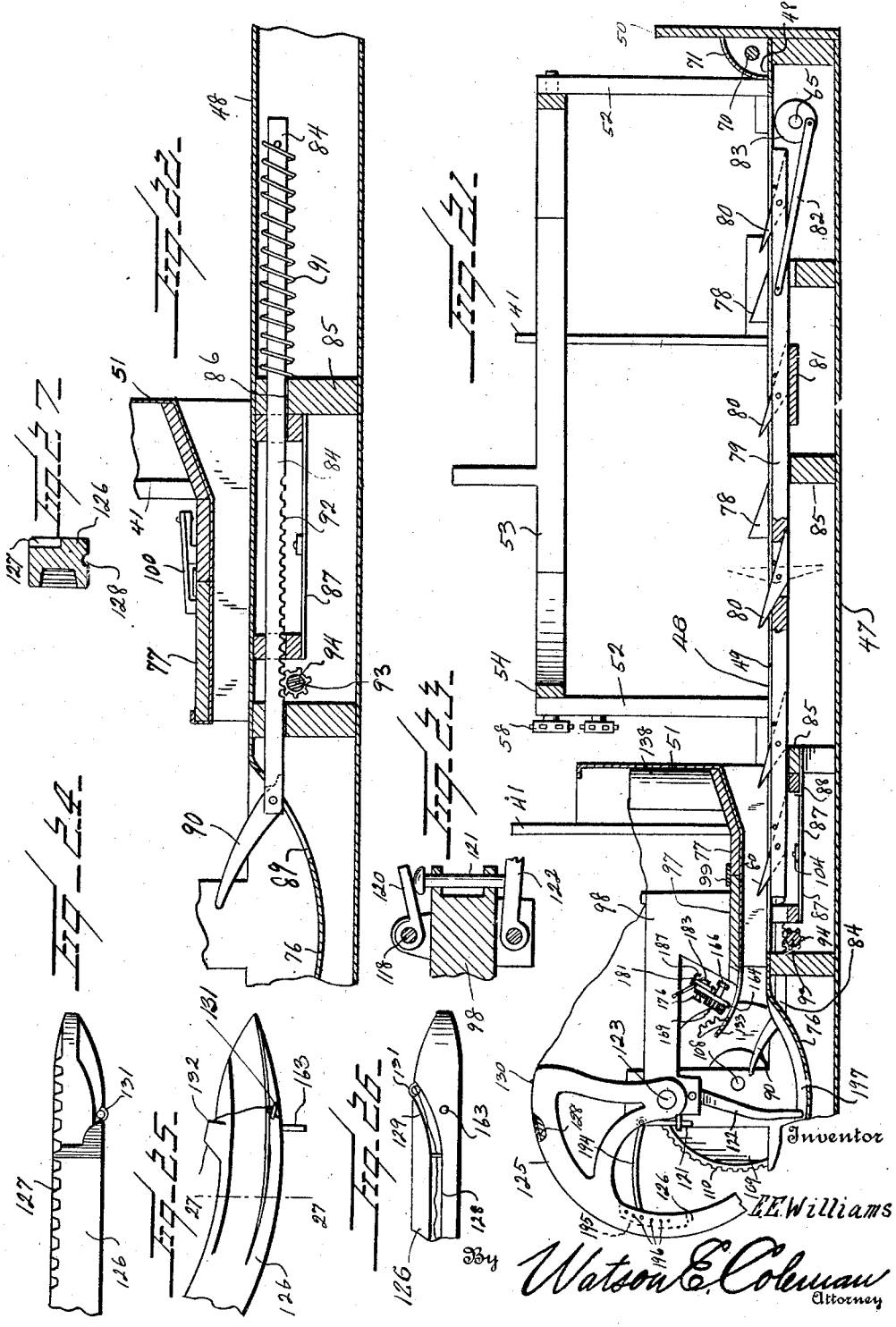

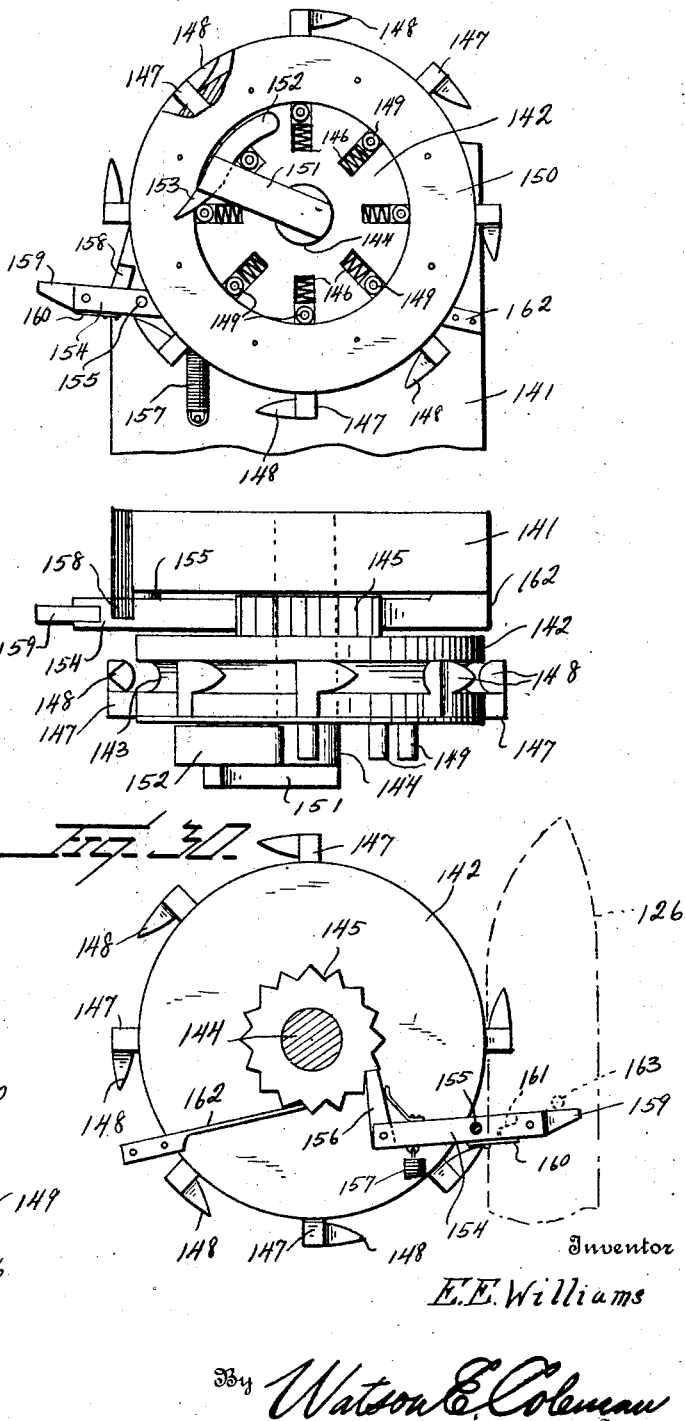

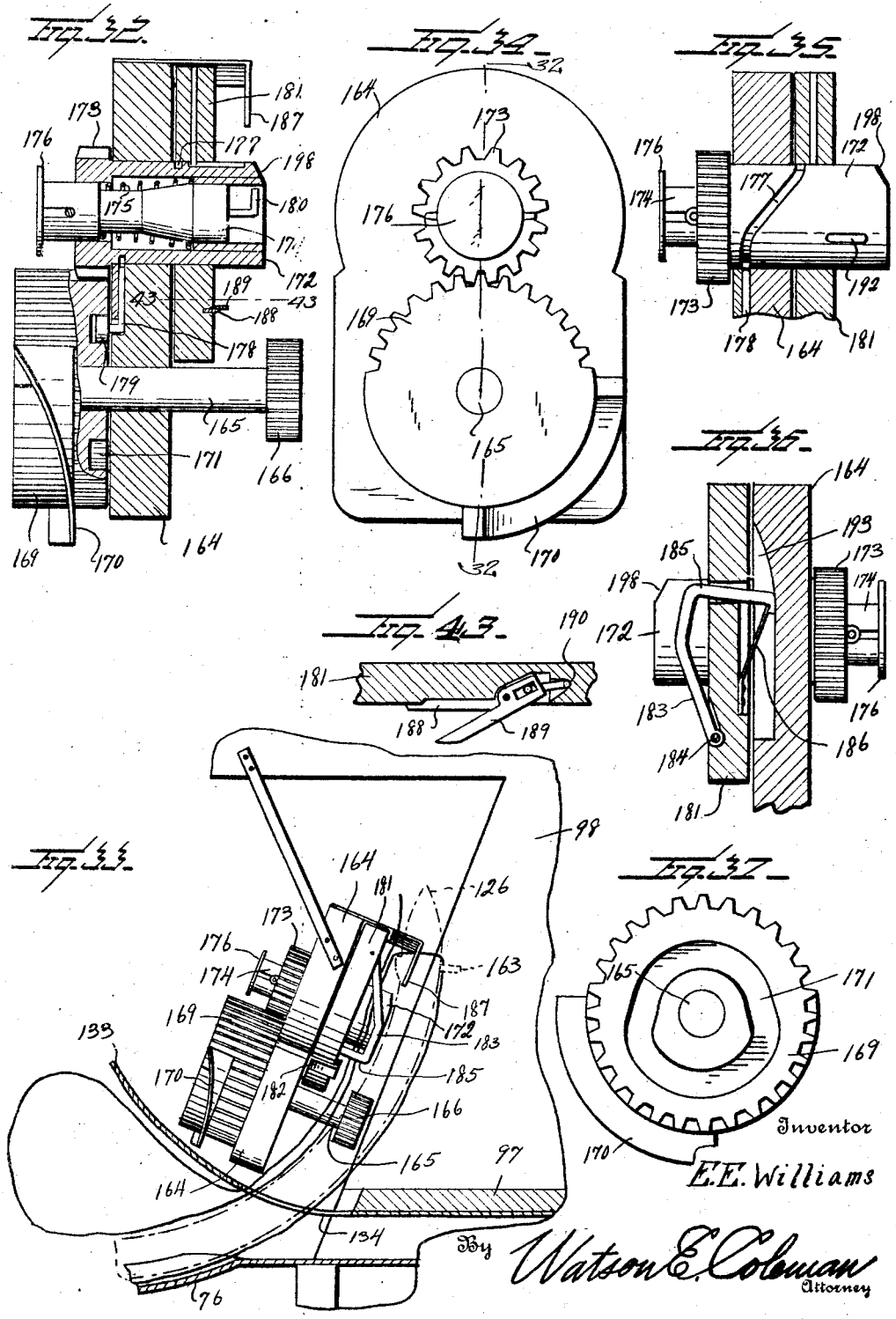

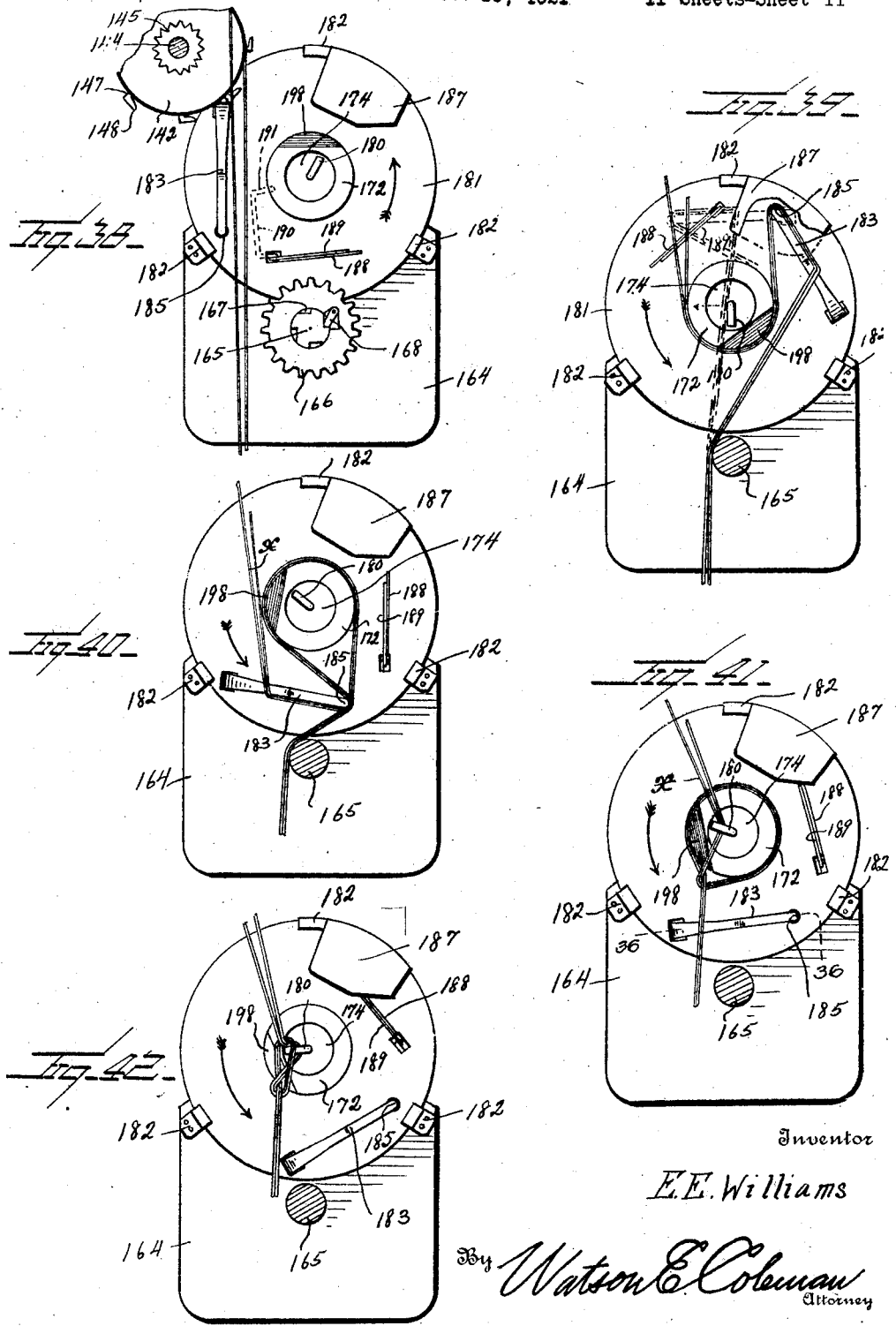

Patented Feb. 10, 1925.

1,525,632

UNITED STATES PATENT OFFICE.

EWING E. WILLIAMS, OF NORWOOD, COLORADO.

HARVESTER AND BINDER.

Application filed December 16, 1921. Serial No. 522,731.

*To all whom it may concern:*

Be it known that I, EWING E. WILLIAMS, a citizen of the United States, residing at Norwood, in the county of San Miguel and State of Colorado, have invented certain new and useful Improvements in Harvesters and Binders, of which the following is a specification, reference being had to the accompanying drawings.

This invention relates to harvesters and binders, and particularly to binders in the nature of a header, that is which may be pushed by draft animals or by a motor either mounted on the frame or mounted on a following tractor.

An object is to provide a construction of this character wherein the grain as it is cut is received upon a platform, and to provide means whereby the grain is pushed forward step by step along the platform into a bundle or sheaf forming trough, and to provide means operated by the traction wheels of the binder acting at predetermined times to gather the grain in the form of a bundle, to pass twine around this bundle, tie the bundle and then eject it either onto the ground or into a bundle carrier.

A further object is to provide means whereby the needle and the bundle tying mechanism will remain inoperative until sufficient grain has been received in the trough to form a sheaf or bundle, said means then acting to render the needle and the bundle tying mechanism operative.

A still further object is to provide improvide improved means for engaging the free end of the bundle twine as the needle moves forward beneath the sheaf, and to provide improved means for tying the bundle twine around the sheaf and cutting the twine off, and to provide means then acting to eject the bundle or sheaf.

Other objects will appear in the course of the following description.

My invention is illustrated in the accompanying drawings, wherein:—

Figure 1 is a top plan view of a harvester and binder constructed in accordance with my invention;

Figure 2 is a side elevation of the construction shown in Figure 1;

Figure 3 is a side elevation of the construction shown in Figure 1, looking from the opposite side of the machine;

Figure 4 is a fragmentary front elevation showing the endless cutter or sickle blade;

Figure 5 is a fragmentary rear elevation of the main frame and the mechanism for transmitting motion from the drive shaft 60 to the shafts 65 and 70;

Figure 6 is a fragmentary rear elevation of the right hand end of the machine showing the mechanism for operating the ejecting and knotting and tying mechanism.

Figure 7 is a section on the line 7—7 of Figure 6;

Figure 8 is an inside face view of the gear wheel 109;

Figure 9 is a fragmentary face view of the gear wheel 109 showing the cam slot therein;

Figure 10 is a fragmentary plan view looking from beneath the main supporting frame;

Figure 11 is a sectional view through cross bar 16 on line 11—11 of Figure 1, showing the means for locking the rod 42;

Figure 12 is a vertical section through the cross bar 16 on the line 12—12 of Fig. 1, showing the steering shaft and means for locking it;

Figure 13 is a section view on line 13—13 of Figure 12;

Figure 14 is an elevation of the forward axle of the main frame, showing in section the frame adjusting means and the clutch;

Figure 15 is a section on the line 15—15 of Fig. 14;

Figure 16 is a fragmentary longitudinal section through the grain trough;

Figure 17 is a framentary vertical section through the elevator;

Figure 18 is an under side plan view of the grain receiving platform;

Figure 19 is a vertical sectional view on the line 19—19 of Figure 1;

Figure 20 is a transverse vertical sectional view on the line 20—20 of Figure 1;

Figure 21 is a section on the line 21—21 of Figure 1;

Figure 22 is a fragmentary longitudinal section on the line 22—22 of Fig. 18 through the machine showing the ejectors and the manner in which they are supported;

Figure 23 is a fragmentary sectional view through the bracket 98 on line 23—23 of Fig. 1 looking in the direction of the arrow showing the means for operating the needle driving mechanism by the accumulation of grain within the grain pan;

Figure 24 is a top plan view of the needle;

Figure 25 is a side elevation of the needle;

Figure 26 is a bottom plan view of the needle;

Figure 27 is a section on the line 27—27 of Figure 25;

Figure 28 is a front elevation of the twine holder;

Figure 29 is a top plan view of the twine holder;

Figure 30 is a rear elevation of the twine holder, the shaft 144 being in section and the needle being shown in dotted lines;

Figure 31 is a fragmentary radial sectional view through the disk 142 and one of the twine holding clamps;

Figure 32 is a longitudinal sectional view through the knotting mechanism on the line 32—32 of Fig. 34.

Figure 33 is a side elevation of the knotting mechanism and a part of the frame of the machine, showing the needle in dotted lines;

Figure 34 is a face view of the knotting mechanism;

Figure 35 is a fragmentary sectional view on the same plane as Fig. 32 through the disk 181 and the base 164 showing the spindle in elevation;

Figure 36 is a fragmentary sectional view on line 36—36 of Fig. 4 through the disk 181 and base 164, showing the twine engaging member 185;

Figure 37 is an inside face view of the gear wheel 169;

Figure 38 is an inside face view of the knotter at its initial position;

Figure 39 is a like view to Figure 38, showing the next position of the parts and showing in dotted lines the manner in which the first loop is formed;

Figure 40 shows a third position of the parts after the loop has been formed and the twine again engaged by the twine engaging member;

Figure 41 is a like view to Figure 40, but showing the twine engaged by the hook 180 and the spindle 172 about to be retracted;

Figure 42 is a like view on the line 36—36 of Fig. 4 to Figure 41, but showing the spindle retracted and the knot tied ready to be slipped off the hook 180;

Figure 43 is a sectional view on the line 43—43 of Figure 32 but showing the pivoted blade open through the disk 181, showing the knife blades in elevation.

Referring to the drawings, and particularly to Figure 1, it will be seen that the main frame of the machine, which is designated generally 10, is supported upon four wheels and draft animals may be hitched to the main frame. Attached to the front of this main frame is the platform upon which the cutting and binding mechanism is mounted, which will be later described.

The main or supporting frame 10 is illustrated as including the longitudinal beams 11. A front axle 12 passes through suitable bearings, as will be later described, and this axle carries upon it the traction wheels 13. The axle rotates with the traction wheels in one direction but upon a rotation of the traction wheels reversely, as when the machine is backing, the axle remains stationary. This is accomplished by the use of the usual pawl and ratchet mechanism commonly found in harvesters and mowing machines, which mechanism does not need any specific description or illustration.

The main frame is operatively connected to this axle so that the main frame may be raised or lowered relative to the axle, as will be later described. The rear ends of the beams 11 are connected by a transverse cross piece 14, upon which the seat 15 is mounted for the driver, this cross piece extending beyond the beams 11. Immediately in front of this cross piece is the brace 16, and extending vertically through this brace 16 is the steering shaft 17, to the upper end of which the steering wheel is connected, this shaft at its lower end carrying a double sprocket wheel 18 (Figs. 10 and 12). The rear wheels 19 are in the form of caster wheels, and the upwardly extending stub 20 of each caster wheel carries a sprocket wheel 21. Chains 22 pass from these sprocket wheels 21 over the sprocket wheels 18 on the shaft 17 so that when this shaft 17 is rotated by the steering wheel, these caster wheels 19 will also be turned to thus steer the machine.

The front axle is carried by a bearing 23 formed upon a vertical slide 24 (Figs. 14 and 15), this slide engaging guides 25 secured to the inner faces of the beams 11, the beams 11 being provided with slots 26 to accommodate the axle 12. The teeth 27 of the slide 24 are adapted to be engaged by pinions on longitudinally extending shafts 28, which shafts are mounted in suitable bearings on the beams 11 and extend rearward along these beams and to a point rearward of the cross piece 14 and are there provided with cranks 29. Suitable means for holding the shafts 28 from rotation after the frame has been vertically adjusted are provided.

Mounted upon the axle 12 is a loose sprocket wheel 30 and mounted to rotate with the axle 12 is a clutch 31 of any suitable construction. This clutch may be shifted to engage the sprocket wheel 30 with the shaft 12 or shifted to disengage the sprocket wheel 30 from the shaft 12. The shifting of this clutch is secured by means of a longitudinally extending shaft 32, one end of which shaft 32 is mounted in a bearing 33 projecting from one of the slides 24, this end of the shaft carrying the fork 34 which engages the clutch, the other end of the shaft being mounted in a suitable bearing on the under side of the cross piece 16 and being provided with an upwardly projecting handle 35 whereby it may be shifted. The beams 11 are forwardly extended beyond the axle 12 and are provided with apertures for the passage of bolts whereby they may be engaged with the frame of the grain platform. I have illustrated the beam 14 as being provided at its ends with singletrees 36 whereby draft animals may be applied to the machine to move it forward after the manner of a header.

The grain platform (Fig. 18) consists of a supporting framework including a transversely extending forward beam 37 and a transversely extending rear beam 38 supported by suitable longitudinally extending braces. Attached to the rear beam 38 are the rearwardly extending, bifurcated members 39. The forward ends of the beams 11 are pivotally connected to these members 39 by bolts 40. Extending upward from the beam 38 are standards 41, to the upper ends of which rods 42 are pivotally connected, these rods extending rearward and being connected to arms 43 mounted upon a transverse shaft 44 (Fig. 1). One of these arms is extended to form a handle 43ª (see Figure 2), and both arms are provided with latches 45 adapted to engage over detents 46 carried by the cross piece 16 (Fig. 11). When these arms are drawn backward by shifting the handle 43ª connected to one of these arms, the rods 42 will be retracted and as a consequence the front end of the grain platform will be raised and when the latches are released the forward end of the grain platform will be lowered. Thus the grain platform may be raised or lowered, as desired.

The under face of the grain platform, that is the under side of the frame formed by the members 37 and 38 and the cross piece spacing the same, is to be covered with sheet metal, as at 47, (Fig. 21) and the upper face of the frame is covered with sheet metal which may be in the form of a longitudinally extending sheet 48 formed in any suitable manner to provide slots 49. At one end of the grain receiving platform there is the upwardly extending wall 50 and inward of the other end of the grain platform there is the upwardly extending wall 51 which is spaced from the upper face of the grain platform so grain may pass beneath this wall. Mounted upon the upper face of the rear beam 38 or in any other suitable position are the uprights 52 which at their upper ends rotatably support a longitudinal rock shaft 53 having arms 54 which at their outer ends support the reel shaft 55, upon which an ordinary reel 56 is mounted. The reel shaft 55 is provided with a sprocket wheel 57, and mounted upon one of the supports 52 are the sprocket wheels 58 adapted to guide the sprocket chain 59, whereby the reel is to be driven. This chain 59 is driven by a sprocket wheel 59ª illustrated as being mounted upon a shaft 60. Any other suitable driving connection, however, may be provided.

Just inward of the beam 38 and below this beam there is provided a trough 61 (Fig. 19) which extends the entire width of the machine, and operating in this trough is a screw conveyor or grain screw 61ª which causes the grain accumulating in said trough to be carried toward one end of the machine and delivered into an elevator casing 63 within which is disposed the usual grain elevator 64 (Fig. 17) of any suitable type and which is adapted to carry this loose grain to sacks or other receptacles. This screw conveyor 61ª is driven from a shaft 65 mounted on the frame of the platform between the upper and lower faces thereof, this shaft being geared with the screw conveyor in any suitable manner, as, for instance, the shaft being provided with a worm 66ª engaging with teeth on the edge of the screw flange of the conveyor. This shaft 65 carries at its end a gear wheel 66, the periphery of which is furnished with teeth and the face of which is furnished with bevel teeth, as at 67. These teeth 67 are engaged by a beveled gear wheel 68 carried upon the shaft 60. Meshing with the peripheral teeth of the gear wheel 66 is a gear wheel 69 meshing with a pinion 69ª carried upon a forwardly extending shaft 70 disposed adjacent the runner or wall 50 and disposed within a housing 71, and carrying at its forward end the band wheel 72. The forward edge of the platform is provided with the outwardly projecting fingers 73 which are constructed in the same manner as the ordinary mowing machine fingers. On the forward end of the platform is mounted a band wheel 72 over which passes an endless band saw 74 constituting the sickle. The upper and lower flights of this band saw pass through the slots of the fingers 73 and between suitable guide rollers and over an idle roller 75. I do not wish to be limited to the use of an endless band saw as a cutting means, as it is obvious that other means might be provided for accomplishing the same result. An ordinary reciprocating cutter bar or sickle might be used in place of the band saw. It will, of course, be understood that the upper flight of the band saw will run in one direction, while the lower flight will run in the opposite direction, both of these flights being contiguous to each other, and that the grain will be cut by the action of the toothed cutting edges of the upper and lower flights of the band saw. The wall 50 projects out in front of the platform and beyond the fingers 73 and the forward end of this wall is rounded so as to ride over the ground and pass between the stalks of the standing grain.

At the left hand side of the grain platform looking toward the front of the machine there is formed a trough 76, within which the grain is gathered, formed and tied, and it will be seen that the grain conveyor 61ª extends past a slot at the rear edge of this platform so that any loose grain which may have been detached from the stalks on the platform will fall into the trough 61 and be carried along by the grain conveyor 61ª to the elevator. Between the trough 76 and the wall 51 there is formed a raised platform 77 (Figs. 21 and 22) and the stalks pass beneath this raised platform and into the trough 76. The slots 49 extend beneath this platform 77 and to the edge of the trough 76. The upper face of the sheet 48 is provided at intervals with upwardly extending, forwardly directed teeth or lugs 78 which prevent the backward movement of the stalks of grain upon the grain receiving platform, and for the purpose of shifting these stalks forward and into the trough 76, I provide longitudinally reciprocating rods 79 disposed in guide slots in the cross braces of the frame, these rods being provided at intervals with pivoted detents 80 or fingers disposed in slots in the rods and so arranged that as the rods move toward the left the fingers or detents will contact with the grain and be lifted thereby to a vertical position and will push the grain forward or toward the trough 76, but upon a reverse movement of the rods these fingers will be forced downward by the grain so that the fingers may slip beneath the stalks of grain.

There are as many of these rods 79 as desired, and these rods are all connected by a transverse cross head 81 which is reciprocated by means of a pitman 82 connected to a crank 83 on the shaft 65. Thus when the shaft 65 is rotated from the main driving shaft 60, the rods 79 will be given a continuous reciprocation which will act to continually shift the grain falling upon the receiving platform into the trough or grain pan 76.

For the purpose of kicking the tied bundles out of the trough 76, I provide the longitudinally extending rods 84 (Figs. 18 and 22). These rods are slidingly mounted in two of the cross pieces 85, these cross pieces beng longitudinally slotted for the reception of said rods, as at 86. These rods pass through guides in a transversely adjustable frame 87, whose purpose will be later stated, this frame being supported for transverse sliding movement by means of the supporting bracket 88 carried on the cross bar 85 (see Fig. 21). The forward ends of the kicking rods extend through relatively wide slots 89 formed in the upwardly extending side wall of the trough 76, and the forward ends of these rods are bifurcated and carry curved fingers 90. As the rods move forward, these fingers will be turned to a vertical position by pressing against the sheaf, and as the rods move further forward the completed sheaf will be forced out of the trough. Upon the return movement, however, these fingers will fall to an approximately horizontal position. The kicker rods 84 are urged to their rearward position by means of springs 91 which are compressed against the cross piece 85 as the rods move forward. The rods for a portion of their length are toothed, as at 92, and for the purpose of urging these rods forward at their proper times to kick out or discharge the completed bundle or sheaf I provide a transverse shaft 93 formed with relatively elongated teeth 94 adapted to engage with the rack teeth 92 in all positions of the sliding frame 87 and therefore all positions of the kicker rods 84. This shaft carries upon it the gear wheel 95 which meshes with a gear wheel 96 (Fig. 6) adapted to be operated in a counter-clockwise direction only by a main operating gear wheel correlated with and operating the needle mechanism, as will be later described.

Slidingly mounted upon the platform 77 is a laterally adjustable section 97 (Fig. 1) which carries the needle shaft supporting arm or bracket 98. This section 97 operates in guides 99 on the shelf or platform 77, and this supporting section 97 is shifted laterally by means of a pitman 100, in turn connected to a crank arm 101 on a vertical shaft 102, the lower end of this shaft carrying a crank arm 103 (Fig. 18) which is connected by a pitman 104 pivotally connected to the sliding frame 87 previously described. Thus it will be seen that when the section 97 is shifted in one direction, the frame 87 will be shifted in the same direction and that the kickers will be shifted with the frame. This section 97 supports the needle carrying bracket, as previously stated, so that the needle and the knot tying mechanism may be shifted.

The purpose of this construction is to provide means whereby the needle and knot tying mechanism may be shifted in accordance with the height of the grain so that if the stalks of grain are short the tie may be made around the middle of the bundle and that if the stalks of grain are long the tie may be made also around the middle of the bundle, and so that the kickers shall properly engage the bundle whether the same be long or short.

In order to provide for shifting this sliding section 97 and the slide 87 at the will of the operator, the crank arm 101 is connected by a pitman 105 to a lever 106 mounted upon the frame of the machine. Mounted upon a post 107 projecting upward from the beam 38 is a shaft 108 of a relatively large wheel 109. This wheel is provided with gear teeth 110 for a distance equal to nearly one half the circumference of the gear wheel, these teeth being adapted to mesh with the teeth of wheel 96. Thus it will be seen that when this gear wheel 109 turns in a clockwise direction, it will turn the wheel 96 in a counter-clockwise direction while the teeth 110 are in engagement with the teeth of wheel 96, but as soon as the teeth 110 escape past the wheel 96, the springs 91 will act to retract the kicker rods 84 and thus rotate the shaft 93 and the gear wheels 95 and 96 to their initial position. Thus during approximately half of the rotation of wheel 109 the kickers will be advanced and during the remainder of the rotation they will remain retracted. The wheel 109 carries upon its shaft 108 the gear wheel 111 which meshes with a gear wheel 112 mounted upon a worm shaft 113 which is carried in suitable bearings on a boxing 114 (Fig. 7), through which the main driving shaft 60 passes. This main driving shaft carries upon it a worm adapted to engage the inclined teeth 115 of the shaft 113 to thus cause the rotation of this shaft 113 and the driving of wheel 109. The boxing 114 is oscillatably mounted upon the shaft 60 so that the wheel 112 may be thrown into or out of mesh with gear wheel 111, this being accomplished by a pitman 116 which is pivotally connected to one corner of the boxing and extends upward to a crank 117 mounted upon a rock shaft 118, in turn oscillatably mounted in the upper end of post 107. This shaft 118 carries upon it a pawl 119 normally resting in a notch 109ª formed in the periphery of wheel 109 adjacent one end of the gear teeth 110 (see Fig. 6).

When this pawl is in the notch 109ª, the boxing 114 will be tilted so that gear wheel 112 will be out of mesh with gear wheel 111. When, however, the shaft 118 is oscillated so as to lift the pawl out of the notch 109ª, the gear wheels 111 and 112 will be brought into mesh with each other. This shaft 118 is formed in two telescopic sections a and b, (Fig. 2) both sections, however, having common rotation. The extremity of the shaft is mounted in a suitable bearing in the bracket 98 and has an outwardly projecting arm 120.

Mounted in guides in the extremity of the bracket 98 is a vertically shiftable pin 121 (Figs. 21 and 23), and pivotally mounted upon the bracket 98 is an arm 122 which extends over the pan and which is slightly bowed so that when the stalks of grain accumulate in this pan to an extent sufficient to form a bundle, the upward pressure of the grain will lift the arm 122, which will raise the pin 121, thus oscillating the shaft 118, raising the pawl or latch 119 out of the notch in gear wheel 109 and at the same time shifting the gear wheels 111 and 112 into driving engagement with each other whereby the wheel 109 will be operated to operate the needle and tying mechanism. The reason for making the rock shaft 118 in telescopic sections is to provide for the lateral adjustment of the needle shaft carrying bracket 98, as previously referred to.

Oscillatably mounted in the bracket 98 and in the post 107 is the needle carrying shaft 123. This shaft is made in telescopic sections for the same reason that the shaft 118 is made in telescopic sections, and that portion of the shaft which projects beyond the post 107 carries upon it a pinion 124 adapted to mesh with internal gear teeth 135, 136, and 137 carried by wheel 109, as shown in Figure 8. The opposite end of the shaft 123 carries upon it the needle. This consists of a sector-shaped body portion 125 having the integral, relatively long arcuate needle 126. The extremity of this needle is pointed and the needle upon its inner face is formed with teeth 127 for a purpose to be later stated. The outer face of the curved arm of the needle is grooved, as at 128, and the outer face of the needle adjacent its point is grooved, as at 129. The twine passes through a guide eye 130 at the base of the curved needle arm, then passes along the groove 128, this groove 128 at the extremity of the needle extending laterally and opening in to the grove 129 and the twine being carried to this groove 129 and across the groove by means of an eye 131. The upper face of the needle adjacent its point is formed with a shoulder 132 which catches the twine after it has passed transversely across the groove 129. Projecting from the underside of the sliding section 77 and carried thereby is an outwardly and upwardly extending sheet metal member 133 formed with a relatively wide slot 134, (see Fig. 33) through which the needle is adapted to oscillate in carrying the thread to the holding and knotting mechanism.

The needle is oscillated by sets of gear teeth carried upon the inner face of wheel 109. Assuming that the gear wheel 109 is rotating in a clockwise direction, then the first set of gear teeth are numbered 135 (see Figure 8). These are internal gear teeth and are adapted to engage the pinion 124 and cause a rotation of the shaft 123, which will shift the needle downward and forward beneath the straw. The next set of teeth operating upon the pinion 124 are designated 136, these teeth being disposed to engage the under side of pinion 124 and facing outward so that they will reverse the movement of shaft 123 and of the needle and carry the needle back to its initial position. The next set of teeth are designated 137 and these are internally toothed teeth, which again cause the needle to move forward for a certain distance. It will thus be seen that when wheel 109 is released it will cause the needle to move forward, that is toward the grain platform, to a position where the twine carried by the needle will be caught by the twine holder, then the needle will be thrown backward to bring the twine beneath the sheaf, then the needle will be again advanced so as to form a bight around the sheaf, and then the twine will be knotted by the knotting mechanism to be hereinafter described and cut off, and the bundle will be ejected by the bundle ejectors or kickers heretofore described. Thus the wheel 109 makes one complete revolution for each bundle and when the wheel 109 has made a complete revolution the latch 119 will drop into the notch 120, thus disengaging the gear wheels 111 and 112 and the wheel 109 will come to a standstill with the parts in their original position and the needle retracted.

In order to render the disengagement of the wheels 111 and 112 positive, I form upon the face of wheel 109 the cam groove 138 which, for the greater portion of its length, is concentric to the axis 108 but which at one point extends toward the rim of the wheel, as at 139. The shaft upon which the wheel 112 is mounted projects slightly beyond the wheel 112 and projects into this cam groove 138. Just beyond this outwardly deflected portion 139 of the cam groove the cam groove is inwardly enlarged, as at 140. When the wheel 109 has made a complete revolution, the portion 139 of the cam groove will shift the wheel 112 out of engagement with wheel 111 and positively depress the latch or pawl 119 into engagement with the notch 120, but upon the raising of this latch 119 and the consequent lifting of the gear wheel 112 from its engagement with the wheel 111, the end of the shaft 113 will shift upward in the portion 140 of the cam groove to permit the meshing of the two gears 111 and 112. Thus I provide positive means for throwing out of mesh the gears 111 and 112 when a complete revolution has been made of the wheel 109 as well as providing means whereby the gear wheels 111 and 112 will be shifted into engagement with each other when sufficient hay or straw has accumulated within the grain pan to form a bundle.

The twine for the needle is contained within the twine receptacle 138ª and passes through suitable friction devices to the butt end of the needle and thence through the groove 128 and eye 131 and is caught and held by the twine holding device which will now be described.

The twine holding device is mounted upon a bracket or other suitable support 141 and comprises a disk-like member 142 having a grooved periphery 143. This member 142 is mounted upon a central shaft 144. The shaft is fixed and the disk-like member rotates upon the shaft. Attached to the rear face of the disk-like member and rotating therewith is a ratchet wheel 145. The face of the disk-like member is formed with a plurality of radially extending grooves 146, these grooves opening upon the periphery of the disk, and disposed in these grooves are the sliding rods 147 which extend through to the periphery of the disk, then laterally to a point over the groove, and carry upon them the twine clamp 148. This twine clamp is rounded upon its under face to fit the groove 143 whose under face is curved longitudinally forward and outward. The inner end of the rod 147 is formed with an outstanding pin or roller 149. The face of the disk outward of the roller 149 is covered by a circular strip of sheet metal 150, but it will be noted that the rods 147 have a limited radial movement in the disk. Mounted upon the central fixed shaft 144 is an arm 151, which at its outer end carries a fixed cam member 152 which is, generally speaking, concentric to the center of rotation of the disk 142, one end of this member being upwardly and outwardly beveled, as at 153. Springs may be used to urge the rods 147 outward and thus urge the clamps 148 away from the periphery of the disk.

For the purpose of giving this disk a step by step rotation to bring the clamps successively into position to engage the twine, I provide the ratchet wheel 145 previously referred to, and mount upon the support 141 the lever 154 which is pivoted at 155 and which at its extremity carries a pawl 156 engageable with the ratchet teeth. A contractile spring 157 urges the lever into such position that its outer end engages against a stop 158 mounted upon the support 141 (see Figure 28). The outer end of the lever is bifurcated and has pivoted in it a pawl 159. This pawl can turn in a clockwise direction against the action of the spring 160 but has only a limited counter-clockwise movement into a position of alignment with the lever 154. At this point it engages a stop 161 and as a consequence the pawl and lever must move together under these circumstances.

In order to prevent a reverse movement of the disk, a pawl 162 is provided which is resiliently urged against the teeth of the ratchet wheel 145. The pawl 159 is disposed in the path of movement of the needle and as the needle moves forward or toward the disk, the needle strikes the pawl 159 and turns it in a clockwise direction against the action of spring 160. The needle passes onward in its course, but upon its return movement a lug, hook or like member 163 on the needle engages this pawl 159 and turns it and the lever 154 in a clockwise direction, causing the pawl 156 to advance the disk one step. Thus while the needle is going backward, one of the hook-shaped clamps 148 will engage over or hook over the twine and as the disk further advances the roller 149 of this particular clamp will engage beneath the beveled end 153 of clamp 152, which will cause the roller to be drawn inward and thus the clamp to be drawn against the periphery of the disk, clamping the twine in position. It will be noted that the hook-shaped clamps 148 move through the hole or recess 129 in the extremity of the needle and that the disk 142 rotates in a plane at right angles to the plane of movement of the needle.

The knotting mechanism is supported upon the arm 98 or bracket which supports the needle shaft 118 and is disposed immediately above the shield 133 which extends out from the sliding section 97. This knotting mechanism comprises a supporting plate or base 164, through which passes a shaft 165, this shaft carrying on its end a pinion 166 which is adapted to be engaged by the rack teeth 127 on the needle. This pinion 166 is loose upon the shaft 165 and the shaft is provided with ratchet teeth 167, while the pinion is provided with a pawl 168 (see Figure 38) so that while the ratchet wheel 166 will oscillate through the action of the reciprocating needle, the shaft 165 will only operate in one direction, that is in a clockwise direction. The shaft 165 extends through the supporting plate or base 164 and at its inner end carries a gear wheel 169 which is relatively wide. Approximately one-half of this gear wheel has teeth of the full width of the gear wheel, the remainder of the teeth being approximately half the thickness of the gear wheel.

Carried by this gear wheel 169 is a cam 170 which extends around the periphery of the gear wheel for a distance of approximately one-quarter of its periphery and which is inclined with reference to the axis of the gear wheel and which projects outward from the periphery of the gear wheel. The inner face of the gear wheel 169 is formed with an eccentric slot 171. Also extending through the supporting plate 164 is an annular shaft or spindle 172. The inner end of this spindle or shaft carries upon it the pinion 173 which meshes with the teeth of gear wheel 169. Disposed within the annular shaft or spindle 172 is a longitudinally shiftable, central rod 174 which is keyed to the spindle for rotation therewith but which is independently shiftable longitudinally thereof and which is urged outward by a spring 175. The inner end of this rod 174 is formed with an outwardly projecting cap or flange 176 which is adapted to be engaged by the cam 170 at a certain stage in the operation of the knotter. The hollow spindle 172 has upon its circumference the sinuous cam track 177, and mounted upon the inner face of the supporting plate 164 is a rod 178 which has reciprocating movement and which at one end has an outwardly projecting portion carrying a roller 179 which enters the cam track or groove 171 so that this pin or rod 178 is projected into the cam track 177 or retracted from engagement with this cam track by the action of the eccentric groove 171. The extremity of the central rod 174 is provided with a hook 180.

Mounted upon the shaft 172 and keyed thereto for rotation therewith is a knotting disk 181. This disk is held from any outward movement relative to the supporting plate 164 by means of the three overlying angular clips 182 (see Fig. 38). Pivotally mounted upon the face of the disk is a twine engaging member 183 which extends tangentially to a circle whose center is the center of rotation of the disk, this twine engaging member being pivoted at 184 (see Fig. 36) and normally extending upward and forward at an inclination, then extending parallel to the disk, and then extending inward, as at 185, and into an opening in the disk and beyond the inner face of the disk. On the inner face of the disk there is disposed a spring 186 which engages the free end of the member 183 and acts to urge it inward. When the member 183 is forced outward, this leaf spring 186 will fit within a recess in the inner face of the disk. The inwardly extending portion 185 constitutes a twine engaging shoulder, as will hereinafter more fully appear.

Mounted upon the base plate 164 at a point almost diametrically opposite the shaft 166 is an overhanging plate 187 which extends over and is parallel to the face of the disk 181 and is disposed over the path of travel of the twine engaging member 183. Mounted upon the face of the disk is a fixed knife blade 188 and pivotally mounted upon the disk to coact with this fixed knife blade is a pivoted knife blade 189 (see Fig. 43). The hinged end of this knife blade is engaged by a small crank shaft 190 which is disposed within the body of the disk and extends over to the central opening of the disk and has a crank 191 which extends into a slot 192 in the spindle 172.

When the spindle 172 is forced inward to its full extent so that the outer end of the spindle is flush with the face of the disk, one end wall of the slot 192 will, by pressing against the crank 191, elevate the knife blade 189, and on the other hand when this spindle is forced outward to its full extent the opposite end of the slot 192 will cause the crank 191 to depress the knife blade 189 against the knife blade 188. The face of the supporting plate 164 which confronts the disk 181 is formed with a circumferentially extending groove 193 which is disposed in the path of movement of the free end of the twine engaging member 183. As before remarked, the spring 186 acts to urge the free end of the member 183 inward so that when the disk 181 moves around to a position where the free end of member 183 is disposed above the groove 193, this member 183 will be depressed. Then in the movement of the disk the free end of the member 183 will eventually ride out at the end of the groove and will be projected and will remain projected until the free end of the member 183 again reaches the beginning of the groove 193. It will be understood that the disk moves in the direction of the arrow in Figure 38, that is in a counter-clockwise direction.

It is to be noted that the rack 127 on the needle 126 is sufficiently long to give two rotations to the pinion 166, shaft 165 and gear wheel 169 while the rack 127 is passing the sector gear 169 and that the pinion 166 has approximately twice the diameter of the pinion 173. Thus a plurality of complete rotations are given to the spindle 172 and the disk 181 as the needle is traveling upward. When the needle travels downward or is retracted, no action is given to the knotter by reason of the pawl and ratchet connection between the pinion 166 and the shaft 165, as before explained.

In order that the bundle may be compressed to a greater or less extent as desired, there is a supplemental arm 194 pivoted in a recess in the supporting arm of the needle and which depends downward from the inner face of this arm and into a groove 195 on the inner portion of one lateral face of the needle. The needle is provided with a series of holes 196 and the free end of this arm 194 may be adjusted toward or from the point of the needle by inserting a pin through any one of these holes and through the free end of the arm 194. The needle operates within a trough 197 which is disposed upon the bundle pan or bundle trough and immediately beneath the shield 133. This needle trough 127 has upwardly extending sides and the grain stalks or straw when discharged rest upon the upper edges of these sides so that the needle will pass beneath the grain. This trough 197 has a width sufficient to permit the lateral movement of the needle in accordance with the adjustment of the sliding section 97.

As before explained, the grain as it is cut is turned down by the reel onto the grain platform and is caused to travel toward the bundle forming mechanism by means of the reciprocating rods 79 and is discharged through the space between the platform 77 and the grain platform and into the trough 76, the grain passing over the fingers 90 and beneath the shield 133 and across the trough 197. During this whole period the wheel 109, and as a consequence the shaft 118, is stationary for the reason that the gear wheel 112 is out of mesh with the gear wheel 111. At this time the needle is in the position shown in Figure 21 and the twine from the needle extends across the space which is to be filled with grain and to one of the clamps on the twine holder so that as the grain is forced into the trough it will be forced against the twine so as to form the bight within which the bundle of grain is more or less disposed. At this time the wheel 109 is so disposed that the latch 119 is engaged in notch 120, that is the position shown in Figure 6.

Now as the grain accumulates in the grain pan, it gradually rises up until it presses on the arm 122. This raises the pin 121, as previously stated, and oscillates the rock shaft 118, which lifts the pawl 119 from the notch 120 and at the same time shifts the gear wheel 112 into engagement with gear wheel 111, thus driving the disk 109 in a clockwise direction in the manner heretofore described.

As the disk rotates in a clockwise direction, the internal gear teeth 135 first engage the pinion 124 and this will cause the rotation of the shaft 123 in a direction to cause the needle to pass beneath the bundle and close the bight of the twine around the middle of the bundle. The upwardly moving needle will not affect the knotting mechanism nor will it affect the twine holding mechanism for the reason, in the one case, that the pinion 166 will move freely on the shaft 165 and, as regards the holding mechanism, will force back the pawl 159. The next set of gear teeth 136 will reverse the movement of the needle and the needle will move rearward. As the needle moves rearward the stud, hook or pin 163 on the extremity of the needle will strike the pawl 159 and will cause the rotation of the disk 142. One of the clamps 148 on the disk has been previously engaged with the extremity of the twine and as the holding disk 142 rotates one step, the next succeeding clamp will have its roller 149 come in engagement with the cam 153 and will catch and clamp the end of the twine which is carried by the needle, which at this time extends across the groove 129 in the end of the needle. Thus both ends of the bight which surrounds the bundle will have been caught and clamped by the twine holder. As the needle moves initially inward under the action of the gear teeth 136, the gear teeth 127 on the needle will cause the rotation of the pinion 166 and this, through the gear wheel 169, will cause a rotation of the spindle 172.

There will be two complete rotations of the spindle 172 and the disk 181 which will act to tie and cut the knot, as will be hereafter explained more in detail, leaving the end of the twine which extends from the needle engaged by the holder and leaving the tied bight on the bundle cut free from the body of the twine. The needle now moves rearward under the action of the teeth 136 to an extent which raises the point of the needle to a sufficient height to entirely free the bundle and at the time when this is accomplished the gear teeth 110 act upon the shaft 93 to cause the projection of the kickers or ejectors 84 with their fingers 90 and these act to push the bundle out of the bundle trough 76. As the gear teeth 110 release their engagement with the pinion on shaft 93, the springs 90 will act to return the ejector rods 84 to their original position. At this time the gear teeth 137 on disk 109 come into action and again reverse the motion of shaft 123 so that the needle is brought down to the position shown in Figure 21 and ready for a fresh accumulation of straw. Then the operation is repeated, as before stated.

The specific operation of the knotter is illustrated in Figures 38 to 42. The projection of the needle carries the two lengths of twine across the disk 181, as illustrated in Figure 38, so that the twine is disposed between the twine engaging member 183 and the spindle 172. The disk 181 turns in a counter-clockwise direction and as it moves around, the shoulder 185 engages the two lengths of twine and carries them around the spindle in the manner shown in Figure 39. When the twine engaging member 183 passes beneath the plate 187, the twine is about to slip off the inclined face of the twine engaging member but is prevented from doing so by this plate 187. As the twine engaging member moves onward, however, the end of the twine is liberated by the plate 187 and is drawn down around the spindle 172, as in dotted lines Figure 39, forming a loop around the spindle. The continued rotation of the disk 181 again carries the twine engaging member to the position shown in Figure 40 and the upper portion of the twine rides up on the inclined face of the twine engaging member so that it is just about to slip off therefrom. The end face of the spindle 172 is beveled at 198 and as the parts reach the position shown in Figure 40, the cam 170 acts upon the rod 174 to force this rod outward so as to carry the hook 180 outward beyond the end of the tubular spindle 172, the hook at this time facing toward the portion x of the twine. As the portion x of the twine slips off the inclined face of the member 183, the tension causes it to slip into the hook and as soon as this has been accomplished the cam 170 passes from over the end of the rod 174 and the spring 175 retracts the rod, causing the portion x of the twine to be drawn into the hollow spindle 172, as in Fig. 41. The instant after this the free end of the twine engaging member 183 reaches the groove 193 and the twine engaging member moves inward, releasing the twine and leaving it in the position shown in Figure 41 looped around the spindle and the portion x caught by the hook 180. At this time the cam groove 171 forces out the pin 178, which enters the cam groove 177 in the spindle so that the further rotation of the spindle causes this spindle to be drawn inward until it is flush with the disk 181 as in Fig. 42. This lets the loop drop off the tubular spindle and the knot pulls together. The hook 180 is still holding the middle of the loop. As the tubular spindle moves inward under the action of the pin 178 and cam groove 177, the inward movement of the spindle causes the rotation of the movable knife blade 189 and as the disk 181 is still revolving in a clockwise direction, the knife is pressed against the twine, cutting it, and when the bundle is kicked out or ejected in the manner heretofore described, the knot is pulled off the hook 180. Upon the continued movement of the disk 181, the tubular spindle 172 is again projected to its normal position.

I claim:—

1. In a harvesting machine, a grain receiving platform having longitudinally extending slots, a bundle forming mechanism at one end of the platform, cutters carried by the platform, reciprocating members having pawls operating in said slots, and traction operated means for driving said reciprocating members.

2. In a harvesting machine, a grain receiving platform having longitudinally extending slots, a bundle forming trough at one end, cutters carried by the platform, longitudinally extending rods disposed beneath the several slots, each rod having pawls extending upward through the slot and adapted to engage the grain upon the movement of the rods toward the trough and slip beneath the grain upon a reverse movement of the rods, and traction operated means for driving said reciprocating rods.

3. In a harvesting machine, a grain receiving platform having longitudinally extending slots, a bundle forming trough at one end, cutters carried by the platform, reciprocating rods disposed beneath the slots of the platform and having pawls extending up through said slots, said pawls engaging the grain upon a movement of the rods toward the trough and slipping beneath the grain upon a reverse movement of the rods, a traction operated driving shaft having a crank, a member connecting all of said rods for simultaneous movement, and a pitman between said crank and said member.

4. In a grain harvester, a grain receiving platform, a trough at one end of the platform into which the grain is discharged, means associated with the platform for cutting the grain, means on the platform for carrying grain into said trough, a bundle forming and tying mechanism including an oscillating needle operating in a plane transverse to the trough, a sliding supporting member mounted above the end of the platform upon which the bundle forming and tying mechanism is carried and upon which the needle is carried, means for adjusting said sliding support toward or from the forward edge of the platform, and a trough-shaped member fitting the bottom of the bundle trough and extending transversely thereacross within which the needle operates, said trough-shaped member being wide enough to permit the adjustment of the needle toward or from the forward edge of the platform.

5. In a grain harvester, a grain receiving platform, a trough at one end of the platform into which the grain is discharged, means associated with the platform for cutting the grain, means on the platform for carrying grain into said trough, a bundle forming and tying mechanism including an oscillating needle operating in a plane transverse to the trough, a sliding supporting member mounted above the end of the platform upon which the bundle forming and tying mechanism is carried and upon which the needle is carried, means for adjusting said sliding support toward or from the forward edge of the platform, and a trough-shaped member fitting the bottom of the bundle trough and extending transversely thereacross within which the needle operates, said trough-shaped member being wide enough to permit the adjustment of the needle toward or from the forward edge of the platform, the trough being slotted at a plurality of points, and reciprocating bundle ejectors mounted beneath the platform and projectible through said slots into engagement with the bundle to eject it, said bundle ejectors being manually shiftable toward or from the forward edge of the trough in accordance with the height of the grain.

6. In a harvesting machine, a needle, a knotting and twine cutting mechanism associated therewith, a driving shaft, a grain receiving platform, means operated by the driving shaft and associated with the platform feeding grain from the platform into position beneath the needle, normally retracted bundle ejectors disposed beneath the platform, means acting automatically when a predetermined quantity of material has accumulated beneath the needle to operatively connect the driving shaft of the needle and cause the shaft to shift toward the knotting and twine cutting mechanism, means acting to operate the knotting and cutting mechanism, means then acting to cause the complete retraction of the needle, means acting upon a complete retraction of the needle to project the ejectors to cause the ejection of the tied bundle, means then acting to shift the needle to a material receiving position, and means then acting to operatively disconnect the driving shaft from the needle.

7. In a harvesting machine, a bundle forming trough and a grain platform discharging therein, means acting to continuously feed the grain along the platform to the bundle forming trough, a plurality of ejector rods mounted below the platform and having fingers pivoted to the extremities of the rod adjacent the trough, the trough being slotted for the projection of said fingers, means normally holding the rods retracted, and means acting at predetermined intervals to cause the projection of the rods and the ejection of the formed bundle from the trough.

8. In a harvesting machine, a bundle forming trough and a grain platform discharging therein, means acting to continuously feed the grain along the platform to the bundle forming trough, a plurality of ejector rods mounted below the platform and having fingers pivoted to the extremities of the rod adjacent the trough, the trough being slotted for the projection of said fingers, springs yieldingly holding the rods in a retracted position, a shaft having gear teeth thereon, the rods having racks with which said gear teeth engage, and means for causing the intermittent rotation of said shafts to cause the intermittent projection of said ejector rods.

9. In a harvesting machine, an oscillatable needle, a driving shaft, a bundle forming trough across which the needle oscillates, a grain platform discharging on the bundle forming trough, reciprocating means for feeding grain along the grain platform to the bundle forming trough, reciprocatable bundle ejectors associated with the trough, the trough having slots through which the ejectors pass to discharge the bundle, means normally holding said rods in a retracted position, a transverse shaft having gear teeth, the rods having racks engaging said gear teeth, a rotatable disk having gear teeth along a portion of its periphery adapted to engage with the said shaft to cause the operation of the shaft and the projection of said rods, means for operatively connecting said disk to the driving shaft or disconnecting it therefrom, means associated with the needle and acting automatically when a predetermined quantity of material has accumulated beneath the needle to operatively connect the driving shaft to the disk, a shaft for oscillating the needle, means on the disk for oscillating the needle toward and from the knotting mechanism, the means for operating the needle being disposed in advance of the gear teeth on the ejector shaft whereby to cause the action of the ejector after the knot has been tied on the bundle and cut.

10. In a harvesting machine, an oscillatable needle, knotting and twine cutting mechanism associated therewith, a driving shaft, means for feeding grain step by step toward the needle, ejectors for ejecting a completed bundle of grain, single means for operating the needle and the bundle ejecting mechanism, and means acting automatically when a predetermined quantity of grain has accumulated beneath the needle to operatively connect the driving shaft to said means and when the bundle has been ejected to automatically disconnect the driving shaft from said means.

11. In a harvesting machine, an oscillatable needle, a shaft therefor, knotting and twine cutting mechanism associated with the needle, a driving shaft, means connected to the driving shaft for feeding the grain step by step toward the needle, means for ejecting the completed bundle including an ejector operating shaft, common means for oscillating the needle and then rotating said ejector shaft, a pivoted member lifted by the accumulation of a predetermined amount of grain beneath the needle, means acting upon a depression of said member locking the needle and ejector actuating means from actuation and disconnecting it from the driving shaft, said means acting when the member is lifted by grain to unlock said needle and ejector actuating means and automatically connect it to the drive shaft.

12. In a harvesting machine, an oscillatable needle, knotting and twine cutting mechanism associated therewith, a driving shaft, means operated by the driving shaft for feeding grain to a position beneath the needle, bundle ejecting means including a shaft having gear teeth, an oscillatable needle actuating shaft having gear teeth, an oscillatable disk having two sets of inwardly extending gear teeth adapted to engage the gear wheel on the needle carrying shaft and having outwardly projecting gear teeth adapted to engage the same shaft whereby to cause an oscillation of the needle carrying shaft, the periphery of said disk opposite that portion carrying the said gear teeth having an arcuate series of teeth adapted to engage the teeth on the ejector shaft after the needle has been oscillated, a vertically movable arm associated with the needle and lifted by an accumulation of grain beneath the needle, a rock shaft operatively connected to said arm, and means associated with said rock shaft and normally locking the disk from actuation and operatively disconnecting the disk from the driving shaft, said means when the arm is raised by an accumulation of grain thereunder acting to unlock the disk and operatively connect the driving shaft to the disk.

13. In a harvesting machine, an oscillatable needle, knotting and twine cutting mechanism associated therewith, a driving shaft, means operated by the driving shaft for feeding grain to a position within the needle, bundle ejecting means including a shaft having gear teeth, an oscillatable needle actuating shaft having gear teeth, an oscillatable disk having two sets of inwardly extending gear teeth adapted to engage the gear wheel on the needle carrying shaft and having outwardly projecting gear teeth adapted to engage the same shaft whereby to cause an oscillation of the needle carrying shaft, the periphery of said disk opposite that portion carrying the said gear teeth having an arcuate series of teeth adapted to engage the teeth on the ejector shaft after the needle has been oscillated, a vertically movable arm associated with the needle and lifted by an accumulation of grain beneath the needle, a rock shaft operatively connected to said arm, a locking dog carried by said rock shaft, the disk having a notch within which said locking dog engages, a crank carried by said rock shaft, an oscillatable gear wheel operatively connected to the drive shaft and adapted when raised to mesh with the gear wheel on said disk, and a rod extending from said crank to said oscillatable gear wheel to shift the gear wheel into engagement with the gear wheel on the disk when the arm on the rock shaft is raised by the accumulation of grain thereunder.

14. In a harvesting machine, a grain platform, a bundle forming trough into which the grain platform discharges, a drive shaft, means operated by the drive shaft for conveying grain to the trough, means for ejecting a completed bundle from the trough including a shaft having gear teeth, an oscillatable curved needle operating across the trough, knotting and twine cutting mechanism associated with the needle, an oscillatable disk common to the needle and the ejector mechanism and having means for oscillating the needle a plurality of times and successively operating the ejector shaft, a gear wheel for the disk, a boxing loosely surrounding the drive shaft for oscillation, a gear carried by said boxing and at all times in mesh with the drive shaft, said gear having a shaft projecting from the boxing, a gear wheel carried on said shaft and adapted to engage the gear wheel on the disk when the boxing is oscillated in one direction, a cam groove on the face of the disk with which the inner end of said shaft engages, said cam groove acting to permit the shaft to drop downward to carry its gear wheel out of mesh with the gear wheel on the disk or to lock the gear wheel in engagement with the gear wheel on the disk, a rock shaft, an arm mounted on the rock shaft and associated with the needle, the arm being normally depressed but raised by a predetermined amount of grain in said bundle trough, a locking member carried by the rock shaft and engaging the clutch on the disk and normally holding the disk from rotation, a crank, a rod extending from the crank to said boxing to hold the gear wheel carried thereby out of engagement with the gear wheel on the disk when the locking member is in engagement with the disk, an elevation of the arm on said rock shaft acting to release the lock from the disk and simultaneously oscillate the boxing to shift the gear wheel carried thereby into engagement with the gear wheel on the disk.

15. In a harvesting machine, an oscillatably mounted needle, a shaft therefor, twine holding, knotting and twine cutting mechanism associated with the needle, a main driving shaft, a gear wheel adapted to be driven by the main driving shaft and having sets of gear teeth adapted to successively engage with the needle carrying shaft as the gear wheel revolves in one direction, means on the main driving shaft adapted to operatively engage the gear wheel but normally out of driving engagement therewith, a bundle pan associated with the needle, means operated automatically by the accumulation of a predetermined amount of material on the bundle pan to shift the means on the driving shaft into engagement with the gear wheel to thereby cause a rotation of the gear wheel in one direction, sets of gear teeth on the gear wheel adapted to engage the needle shaft as the gear wheel rotates to shift the needle shaft to carry the needle across the grain pan into engagement with the holding and knotting mechanism and then shift said needle away from the knotting and tying mechanism and into a position permitting the ejection of the bundle and then shift said needle reversely to carry the point of the needle into position above the forward edge of the grain pan, means on the needle for operating the twine holding, knotting and cutting mechanism upon a retraction of the needle, and means operated by the gear wheel for causing the ejection of the tied bundle from the grain pan when the needle has been completely retracted.

16. In a harvesting machine, an oscillatable needle, a needle shaft upon which the needle is mounted and having a pinion, a gear wheel, a driving shaft, a gear mounted upon and driven by the driving shaft and shiftable into or out of engagement with the gear wheel, a grain pan with which the needle is associated, means disposed above the grain pan acting when the grain has accumulated upon the pan to a predetermined extent to shift the gear wheel on the driving shaft into engagement with the first named gear wheel, a locking member normally engaging the gear wheel and holding it from movement but shifted out of engagement with the gear wheel upon the operative engagement of the driving shaft with the gear wheel, a plurality of gear teeth on the gear wheel engaging the pinion on the needle shaft and acting to oscillate the needle a plurality of times in relatively reverse directions, and means acting when the first named gear wheel has completed one revolution to positively disconnect the operative engagement between the driving shaft and the gear wheel and shift the locking member into engagement with the gear wheel.

17. In a harvesting machine, a bundle forming pan, an arcuate oscillatable needle associated therewith, a needle shaft having a pinion, a disk having a gear wheel thereon, a constantly operating driving shaft, shiftable means for transmitting the motion of said driving shaft to said gear wheel to thereby rotate the disk in one direction, a rock shaft having operative engagement with said means and carrying a locking pawl normally in engagement with the disk, means disposed above the bundle pan for automatically rocking said shaft upon the accumulation of a predetermined quantity of grain upon the bundle pan to thereby shift the locking pawl out of engagement with the disk and simultaneously operatively connect the driving shaft with said disk, and gear teeth on the disk adapted as the disk rotates to give a plurality of oscillations to the needle shaft in relatively opposite directions and of different amplitude.

18. In a harvesting machine, a bundle forming pan, an arcuate oscillatable needle associated therewith, a needle shaft having a pinion, a disk having a gear wheel thereon, a constantly operating driving shaft, shiftable means for transmitting the motion of said driving shaft to said gear wheel to thereby rotate the disk in one direction, a rock shaft having operative connection with said means and carrying a locking pawl normally in engagement with the disk, means disposed above the bundle pan for automatically rocking said shaft upon the accumulation of a predetermined quantity of grain upon the bundle pan to thereby shift the locking pawl out of engagement with the disk and simultaneously operatively connect the driving shaft with said disk, a set of internal gear teeth on the disk adapted to engage the pinion on the needle shaft to rock the shaft in a direction to carry the needle beneath the bundle, twine engaging and twine knotting and cutting mechanism operated by the needle at the end of its first named throw, a set of gear teeth on the disk acting as the disk is rotated to then retract the needle to a position permitting the ejection of the bundle, means then acting to eject the tied bundle from the bundle pan, and a third set of teeth on the disk then acting to shift the needle shaft in a reverse direction to carry the needle to a bundle receiving position at a point in register with the forward edge of the bundle pan, and means then acting to positively shift the rock shaft in a reverse direction to carry this locking member into engagement with the disk and simultaneously disconnect the operative engagement between the driving shaft and said disk.

19. In a harvesting machine, a needle, a needle shaft having a pinion, a disk having sets of internal and external gear teeth upon one face adapted as the disk is rotated to oscillate the needle shaft, a rock shaft disposed above the disk and having a pawl, the disk having a notch into which the pawl is normally disposed, a driving shaft, a boxing oscillatably mounted upon the driving shaft, a gear wheel carried by the boxing and operatively engaged with the driving shaft, a gear wheel carried upon the disk with which the first named gear wheel is adapted to engage when the boxing is lifted, means for lifting the boxing to engage the gear wheel comprising a crank on the rock shaft, an operative connection between the crank and boxing, means acting automatically upon the accumulation of a predetermined quantity of material beneath the needle to rock said rock shaft in a direction to lift the locking member from the disk and shift the boxing to mesh the gear wheels, and means on the gear wheel acting when the gear wheels have made a complete revolution to positively shift the gear wheels out of mesh and rock the rock shaft to carry the locking member into said notch.

20. In a harvesting machine, a needle, a needle shaft having a pinion, a disk having sets of internal and external gear teeth upon one face adapted as the disk is rotated to oscillate the needle shaft, a rock shaft disposed above the disk and having a pawl, the disk having a notch into which the pawl is normally disposed, a driving shaft, a boxing oscillatably mounted upon the driving shaft, a gear wheel carried by the boxing and operatively engaged with the driving shaft, a gear wheel carried upon the disk with which the first named gear wheel is adapted to engage when the boxing is lifted, means for lifting the boxing to engage the gear wheel comprising a crank on the rock shaft, an operative connection between the crank and boxing, means acting automatically upon the accumulation of a predetermined quantity of material beneath the needle to rock said rock shaft in a direction to lift the locking member from the disk and shift the boxing to mesh the gear wheels, the disk having a cam groove in its face operatively engaging the boxing and acting when the disk has made one complete revolution to shift the boxing in a direction to carry the gear wheels out of mesh, the rock shaft being simultaneously shifted to carry its locking member into engagement with the notch on the disk.

21. In a harvesting machine, a bundle pan, an oscillatable needle associated therewith, driving mechanism for the needle normally out of engagement therewith, means for locking the needle from movement, and means for unlocking the needle and simultaneously operatively connecting the driving mechanism with the needle comprising an arm pivoted at its upper end and extending over the bundle pan and adapted to be lifted thereby.

22. In a harvesting machine, a bundle pan, an oscillatable needle associated therewith, driving mechanism therefor normally out of operative engagement with the needle, a rock shaft operatively connected to the needle driving mechanism and adapted when rocked in one direction to shift the needle driving mechanism into operative engagement with the needle, means for operating said rock shaft to unlock the needle and unlock the driving mechanism thereof upon the accumulation of a predetermined quantity of material in the bundle pan comprising an arm on the rock shaft, a vertically movable member disposed beneath the arm, and an arm pivoted at its upper end extending transversely of the bundle pan and adapted when raised to engage said vertically movable member to thereby lift it and shift the rock shaft.

23. In a harvesting machine, a bundle pan, an oscillatable needle associated therewith, a needle shaft having a pinion, a disk having a plurality of sets of relatively reversely disposed gear teeth adapted to engage said pinion as the disk is rotated to thereby oscillate the needle shaft and needle, driving mechanism for the disk, means acting upon the accumulation of a predetermined quantity of material in the bundle pan to operatively connect the driving mechanism with said disk, means acting after a predetermined number of oscillations of the rock shaft to positively disconnect the driving mechanism from the disk, spring retracted ejector rods associated with the bundle pan, the shaft having pinions engaging said ejector rods, a gear wheel mounted upon the shaft, a segment gear carried by said disk adapted to engage said gear wheel on the ejector shaft acting at a predetermined time to rotate the ejector shaft to thereby project the ejectors, and springs acting to retract the ejectors when the segment gear has passed the associated gear wheel.

24. In a harvesting machine, a bundle pan, a needle movable transversely across the bundle pan and having a twine groove extending from its rear end to its tip, means for oscillating the needle twine catching and holding means on the inner side of the bundle pan adapted to engage the twine as the needle moves across the bundle pan and draw the twine from the needle as the needle moves up from the holding means, and twine knotting and cutting mechanism disposed to engage the twine and knot and cut the same as the needle moves away from the knotting and twine holding means.

25. In a harvesting machine, an oscillatable needle, means for oscillating the needle, twine knotting mechanism associated therewith and a twine catching and holding mechanism associated therewith, the latter comprising a rotatable member carrying on its periphery a plurality of equi-distantly spaced twine engaging clamps, and means for giving a step by step movement to the twine catching and holding mechanism upon each oscillation of the needle.

26. In a harvesting machine, an oscillatable needle, means for oscillating the needle, knotting means associated therewith and means located adjacent the knotting means for catching and holding the twine comprising a rotatable member carrying on its periphery a plurality of equi-distantly spaced twine engaging clamps, means normally urging the clamps outward from the periphery of the rotatable member, means acting to retract each clamp as it passes the needle, and means for giving a step by step rotation to the rotatable member upon each oscillation of the needle.

27. In a harvesting machine, an oscillatable needle, means for oscillating the needle, a knotting mechanism associated therewith means located adjacent the knotting mechanism for catching and holding the twine carried by the needle comprising a rotatable disk having a groove in its periphery, a plurality of equi-distantly spaced twine engaging clamps disposed in said groove removable toward or from the periphery of the disk, means normally urging said clamps outward, a cam located adjacent the path of the needle and acting as the disk is rotated to cause the retraction of the clamps from the twine, the cam being of a length to hold two clamps retracted simultaneously, and means carried by the needle for giving a step by step rotation to the disk upon each retraction of the needle.

28. In a harvesting machine, an oscillatable needle, means for oscillating the needle, knotting mechanism associated therewith, means located adjacent the knotting mechanism for catching and holding the twine comprising a disk having a ratchet and pawl disposed in the path of the needle and adapted to engage the ratchet to give a step by step rotation to the disk on each oscillation of the needle, a plurality of twine clamps disposed upon the periphery of the needle, a series of radial rods mounted in the disk and engaging said clamps and having laterally projecting studs, means urging the clamps outward, and means for causing the successive retraction of the clamps comprising a fixed cam disposed in the path of movement of said studs and of a length sufficient to hold two clamps simultaneously in their retracted twine binding position.

29. In a harvesting machine, an oscillatable needle, means for oscillating the needle, twine knotting and cutting mechanism associated therewith, a twine catching and holding mechanism associated therewith comprising a rotatable disk having a groove upon its periphery, a series of equi-distantly spaced twine engaging clamps disposed within said groove, rods carried in radial slots in the disk and connected at their outer ends to the clamps, laterally projecting studs on the inner ends of the rods, a fixed cam disposed in the path of movement of said studs and adapted to engage the studs and draw the clamps successively inward as the disk rotates, said cam being of a length sufficient to retract two clamps simultaneously, and means permitting passage of the needle past the holding mechanism without affecting the holding mechanism but giving a one step rotation to the disk upon the retraction of the needle to thereby carry one of said studs in engagement with the cam upon each retraction of the needle.

30. A knotting mechanism for harvesting machines comprising a rotatable disk, a central, longitudinally reciprocatable, normally projected rotatable, hollow spindle on which the disk is mounted for rotation therewith, a twine engaging retractible hook operating through the hollow spindle and rotatable therewith, a projecting twine engaging member on the face of the disk, means for rotating the disk to cause the member to engage the twine and carry the twine around the spindle to form a primary loop, means for projecting the hook beyond the spindle while the disk and spindle are making their second revolution, said twine engaging member simultaneously acting to carry the twine across the open end of the spindle and into engagement with the hook, means then acting to retract the hook, means then acting to retract the spindle, a knife carried on the disk and rendered operative when the spindle is retracted to thereby cut the twine, and means then acting to detach the knot from the hook to again project the spindle.

31. A knotting mechanism for harvesting machines comprising a disk, a central, normally projected reciprocatable, hollow spindle on which the disk is mounted for rotation therewith, a retractible hook operating through the hollow spindle, a twine engaging member pivotally mounted upon the disk and formed to provide an upwardly and forwardly inclined surface and a shoulder, said twine engaging member being depressible during a portion of the rotation of the disk, means for rotating the disk to cause the twine engaging member to engage the twine and carry the twine around the spindle to form a primary loop, means then acting to project the hook from the spindle, said twine engaging member simultaneously acting to carry one end of the twine across the open end of the spindle and into engagement with the hook, means then acting to retract the hook upon a further rotation of the disk, means then acting to retract the spindle to thereby permit the primary loop to close around the hook, a knife carried on the disk and rendered operative when the spindle is retracted to thereby cut the twine, and means acting to detach the knot from the hook and return the spindle to its projected position.

32. A knotting mechanism for harvesting machines comprising a disk, a central, reciprocatable, normally projected hollow spindle on which the disk is mounted for rotation therewith, a retractible hook operating through the hollow spindle, a twine engaging member pivotally mounted upon the disk and formed to provide an upwardly and forwardly inclined surface and a shoulder, said twine engaging member being depressible during a portion of the rotation of the disk, means for rotating the disk to cause the twine engaging member to engage the twine and carry the twine around the spindle to form a primary loop, means then acting to project the hook from the spindle, said twine engaging member simultaneously acting to carry one end of the twine across the open end of the spindle and into engagement with the hook, means then acting to retract the hook upon a further rotation of the disk, means then acting to retract the spindle to thereby permit the primary loop to close around the hook, a knife pivotally mounted upon the disk and held in a depressed position when the spindle is projected but shifted to a projected, twine cutting position upon the retraction of the spindle to thereby cut the twine after the knot has been formed, and means acting after the twine is cut to detach the knot from the hook and to return the spindle to its projected position.

33. A knotting mechanism for harvesters comprising a disk, a knife carried upon the face of the disk in retracted position, a central, reciprocatable, normally projected, rotatable, hollow spindle on which the disk is mounted for common rotation, a retractible hook operating through the hollow spindle, a twine engaging member pivoted upon the face of the disk at one end, said twine engaging member having its upper face inclined forward and away from the disk and then extending into the disk to form a shoulder, a spring urging the retraction of said twine engaging member, means preventing said retraction under the action of said spring during the greater portion of the rotation of the disk but permitting said retraction at a particular point in the path of rotation of the disk, means for holding the twine across the face of the disk between the spindle and the twine engaging member, means for rotating the disk to cause the shoulder of the twine engaging member to engage the twine and form a bight around the spindle, means engaging the upper face of the twine engaging member when a loop has been formed around the spindle to prevent the disengagement of the twine from the inclined face of the twine engaging member until one end of the twine has passed the spindle to thereby form a loop around the spindle, means for projecting the hook beyond the spindle upon the second revolution of the disk to thereby cause the hook to engage the twine as the twine is drawn across the hook, said means then permitting the retraction of the hook upon a further rotation of the disk, means then acting to retract the spindle to permit the knife to close upon the hook, means acting upon the retraction of the spindle to cause the projection of the knife to cutting position, and means then acting to project the spindle.

34. In a harvester, twine knotting means comprising a rotatable, reciprocatable, normally projected, hollow spindle, a disk rotating with the spindle but held from reciprocation therewith, means on the disk for carrying the twine around the spindle as the disk is rotated, a reciprocatable hook mounted within the hollow spindle and adapted to be projected beyond the same or retracted into the spindle, means for driving the spindle, retracting the spindle and reciprocating said hook comprising a shaft having a gear wheel, a pinion on the spindle with which the gear wheel engages, a cam carried by the gear wheel and engaging the hook to project the same, the spindle being formed in its periphery with a cam track, a pin adapted to be shifted into engagement with the cam track and when so shifted causing the projection and retraction of the spindle, the gear wheel having a cam operatively engaging said pin to shift it, and a spring normally causing the retraction of the hook.

35. In a harvester, twine knotting means comprising a rotatable, reciprocatable, normally projected, hollow spindle, a disk rotating with the spindle but held from reciprocation therewith, means on the disk for carrying the twine around the spindle as the disk is rotated, a reciprocatable hook mounted within the hollow spindle and adapted to be projected beyond the same or retracted into the spindle, means for driving the spindle, retracting the spindle and reciprocating said hook comprising a shaft having a gear wheel, a pinion on the spindle with which the gear wheel engages, a cam carried by the gear wheel and engaging the hook to project the same, the spindle being formed in its periphery with a cam track, a pin adapted to be shifted into engagement with the cam track and when so shifted causing the projection and retraction of the spindle, the gear wheel having a cam operatively engaging said pin to shift it, a spring normally causing the retraction of the hook, a knife blade fixed upon the face of the disk, a pivoted blade associated with the fixed blade, a shaft mounted in the disk and having a crank at one end connected to the pivoted blade, the other end of the shaft having a crank, the spindle having a longitudinally extending groove into which the last named crank extends whereby as the spindle is shifted in one direction the pivoted blade will be moved away from the fixed blade and in the other direction the pivoted blade will be moved toward the fixed blade.

36. In a harvesting machine, a knotting mechanism including a gear wheel moving freely in one direction but operatively engaging the knotting mechanism to actuate it upon a movement of the gear wheel in the other direction, a twine engaging and holding device, a needle having its path of movement between the gear wheel and the twine engaging and holding device, means for oscillating the needle, means on the butt end of the needle acting to actuate the twine engaging and holding device upon the initial part of the rearward movement of the needle, and teeth adjacent the point of the needle engaging the knotting mechanism and causing its actuation upon a rearward movement of the needle.

37. In a harvesting machine, an oscillating needle having a shoulder at its butt end, a twine gripping and holding mechanism including a disk having equi-distantly spaced, twine clamping members on its periphery, means operatively engaging the disk and adapted to be engaged by the shoulder on the butt of the needle for causing a one step rotation of the disk in one direction upon the initial retraction of the needle to thereby carry one of said holding devices away from the path of movement of the needle and another of said holding devices into the path of movement of the needle, a knotting mechanism disposed adjacent the path of movement of the needle, and means on the needle adjacent the point for actuating the knotting mechanism upon a retraction of the needle and as the point nears the knotting mechanism.

38. In a harvesting machine, a bundle pan, a trough-shaped member fitting the bundle pan and having upwardly extending sides, an arcuate needle mounted for oscillation through said trough-shaped member, twine engaging means carried by the needle, a shield extending out above the pan and beneath the twine engaging means and having a slot through which the needle passes, twine holding and knotting mechanism disposed in the path of movement of the needle and above said shield, and means actuated by the needle for successively operating the twine holding mechanism and the knotting mechanism as the needle is retracted from a position adjacent the twine holding and knotting mechanisms.

In testimony whereof I hereunto affix my signature.

EWING E. WILLIAMS.